(12) United States Patent
Ishida

(10) Patent No.: US 8,335,389 B2
(45) Date of Patent: Dec. 18, 2012

(54) IMAGE PROCESSING DEVICE AND METHOD FOR BENZIER APPROXIMATION ACCURACY WITHIN A PRE-DEFINED DATA AMOUNT OR PREDETERMINED PROCESSING TIME

(75) Inventor: Yoshihiro Ishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 901 days.

(21) Appl. No.: 12/434,349

(22) Filed: May 1, 2009

(65) Prior Publication Data
US 2009/0279802 A1   Nov. 12, 2009

(30) Foreign Application Priority Data
May 7, 2008   (JP) .................... 2008-121158

(51) Int. Cl.
*G06K 9/48* (2006.01)
(52) U.S. Cl. ..................................... 382/242
(58) Field of Classification Search .......... 382/242
See application file for complete search history.

(56) References Cited

U.S. PATENT DOCUMENTS

| | | | |
|---|---|---|---|
| 5,666,439 A | 9/1997 | Ishida et al. | 382/190 |
| 5,878,161 A | 3/1999 | Ishida et al. | 382/198 |
| 5,900,948 A | 5/1999 | Shigeeda et al. | 358/448 |
| 6,404,921 B1 | 6/2002 | Ishida | |
| 7,043,712 B2 * | 5/2006 | Mukherjee et al. | 716/52 |
| 7,181,081 B2 * | 2/2007 | Sandrew | 382/254 |
| 7,212,205 B2 * | 5/2007 | Uesaki et | 345/423 |
| 7,333,670 B2 * | 2/2008 | Sandrew | 382/254 |
| 2004/0090437 A1* | 5/2004 | Uesaki et al. | 345/420 |
| 2005/0238244 A1 | 10/2005 | Uzawa | |
| 2007/0262992 A1 | 11/2007 | Ito | |
| 2008/0050027 A1* | 2/2008 | Bashyam et al. | 382/238 |

FOREIGN PATENT DOCUMENTS

| | | | |
|---|---|---|---|
| EP | 482862 A2 * | 4/1992 | |
| EP | 549351 A2 * | 6/1993 | |
| JP | 05/108823 A | 4/1993 | |
| JP | 3026592 B | 3/2000 | |
| JP | 3049672 B | 6/2000 | |
| JP | 2002-244643 A | 8/2002 | |
| JP | 2005-310070 A | 11/2005 | |
| JP | 2005346137 A | 12/2005 | |
| JP | 2007-305034 A | 11/2007 | |

OTHER PUBLICATIONS

JP 05-108823 machine English-translation, pp. 1-10, Apr. 30, 2012.*
JP 2005-346137 machine English-translation, pp. 1-31, Apr. 30, 2012.*
Japanese Office Action issued on May 15, 2012, in counterpart Japanese application No. 2008-121158.

* cited by examiner

*Primary Examiner* — David Zarka
(74) *Attorney, Agent, or Firm* — Fitzpatrick, Cella, Harper & Scinto

(57) ABSTRACT

The purpose of the invention is to improve the Bezier approximation accuracy with relatively high speed processing so far as data amount permits, and to provide an image processing device and image processing method thereof which improves the Bezier approximation accuracy within the predetermined processing time.

9 Claims, 19 Drawing Sheets

EXAMPLE OF
INPUT BINARY IMAGE

--PRIOR ART--

EXTRACTED ROUGH PROFILE

--PRIOR ART--

RESULT OF VECTORIZATION LEVELING
(FUNCTIONAL APPROXIMATION)

--PRIOR ART--

REPRODUCED BINARY IMAGE
(MIDDLE-COATED)

--PRIOR ART--

FIG.10

| FIG.10A | FIG.10B |

FIG.10A

FIRST PROFILE LINE LOOP

| THE TOTAL NUMBER $a$ OF PROFILE LINE LOOP IN AN IMAGE |
| THE TOTAL NUMBER $\alpha_1$ OF INTERVALS IN THE FIRST PROFILE LINE LOOP |
| THE TOTAL NUMBER $\beta_{11}$ OF POINTS OF THE FIRST INTERVAL IN THE FIRST LOOP | ⎫ THE TOTAL POINTS IN THE HEAD INTERVAL (FIRST INTERVAL) IN THE FIRST PROFILE LINE LOOP
| THE x AND y COORDINATES OF THE FIRST POINT IN THE FIRST INTERVAL | THE COORDINATE VALUE OF THE FIRST POINT IN THE FIRST INTERVAL ($p_1^1$ OF THE FIRST INTERVAL AND $p_n^1$ OF THE LAST INTERVAL)) ($n$-TH INTERVAL)
| THE x AND y COORDINATES OF THE SECOND POINT IN THE FIRST INTERVAL | ⎭ THE COORDINATE OF THE SECOND POINT IN THE FIRST INTERVAL
| ...... |
| THE x AND y COORDINATES OF THE $\beta_{11}$-TH POINT IN THE FIRST INTERVAL | THE COORDINATE OF THE $\beta_{11}$-TH POINT IN THE FIRST INTERVAL
| THE NUMBER $\gamma_{11}$ OF THE POINT $p_f$ IN THE FIRST INTERVAL IN THE FIRST LOOP | THE NUMBER OF THE POINT $p_f$ AMONG THE FIRST POINT TO THE $\beta_{11}$-TH POINT IN THE FIRST INTERVAL (EITHER OF 2 TO $\beta_{11}$)
| THE x AND y COORDINATES OF THE CONTROL POINT C1 |
| THE x AND y COORDINATES OF THE CONTROL POINT C2 |
| A POINTER (ADDRESS INFORMATION) TO THE HEAD OF DATA AREA IN THE SECOND INTERVAL | A POINTER (ADDRESS INFORMATION) TO THE HEAD OF DATA AREA IN THE SECOND INTERVAL IN THE FIRST PROFILE LINE LOOP

FIRST INTERVAL

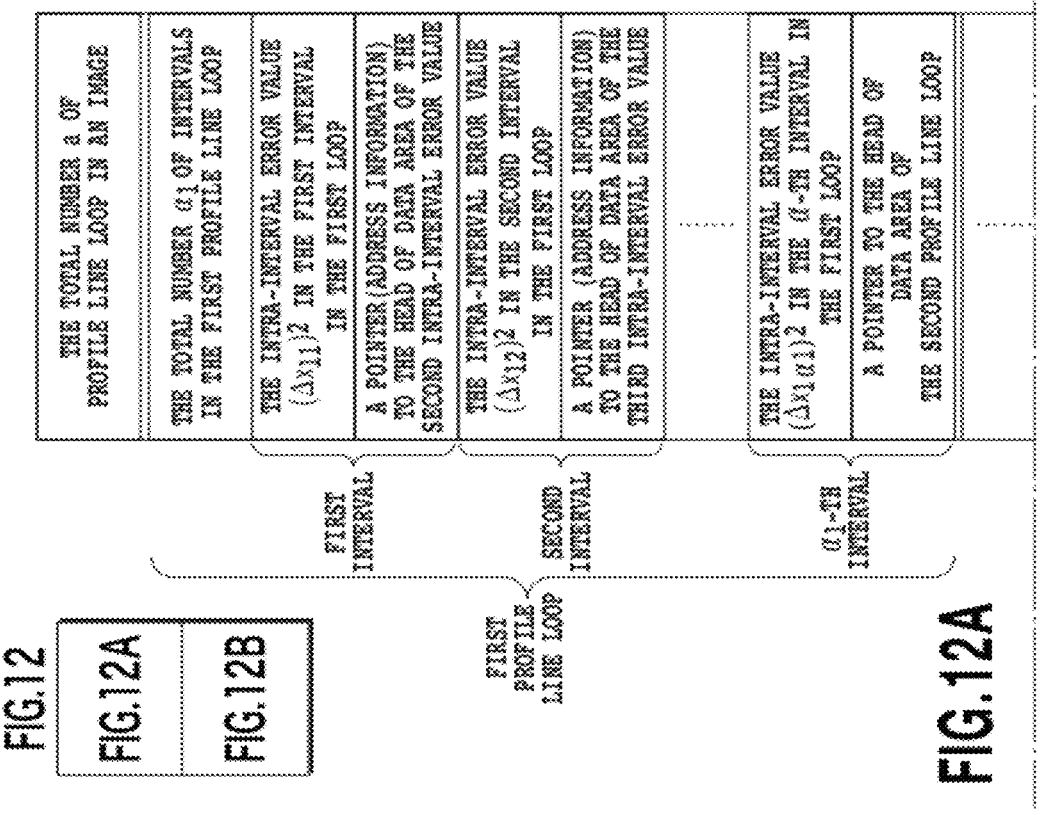

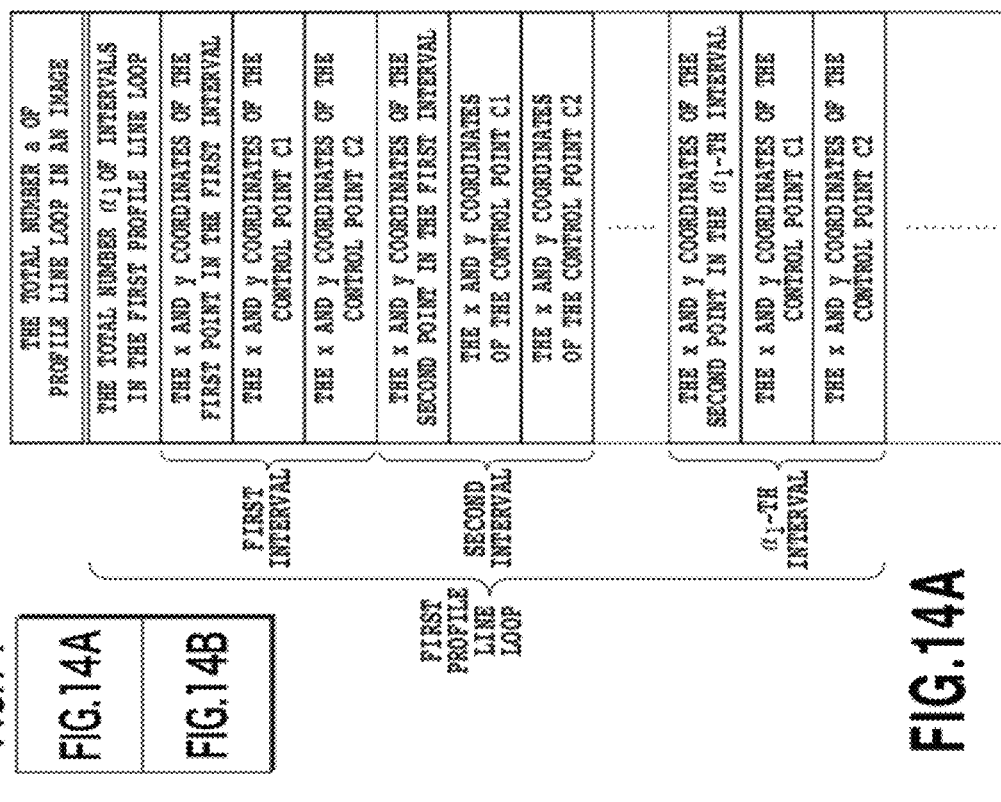

IMAGE PROCESSING DEVICE AND METHOD FOR BENZIER APPROXIMATION ACCURACY WITHIN A PRE-DEFINED DATA AMOUNT OR PREDETERMINED PROCESSING TIME

BACKGROUND OF THE INVENTION

1. Field of the Invention

The invention relates to a image processing device and image processing method, and more particularly, to a image processing device and image processing method for functionally approximating an outline and center line of figures.

2. Description of the Related Art

Nowadays, digitalization of existing data for reuse has become common due to increasing demands on paperless data. Traditionally, image data were reused in such a way that the data is converted into vector data using vectorization techniques after binarization, then utilized with CAD software, etc.

Meanwhile, recently, environmental problems are emphasized even in office. As a solution for the problem, efforts to move from a paper-based system are mounting rapidly. As one way of achieving the efforts, paper documents can be read with a scanner, converted into the corresponding electronic data, and then stored. However, there is another problem that while the paper documents can be maintained as electronic data, the documents themselves cannot be reused since the files themselves are in image format. Furthermore, even when the documents are stored in storage media, there would be tradeoff problems between image qualities of the stored image information and the capacity of a storage area for storing the electronic data. For instance, the file size of an electronic data would be large if the data is stored in high quality.

One way of simultaneously solving above two problems resulting in a tradeoff is to divide read images into objects such as character area, photo image area, line-drawing area, table area, etc. and vectorize them respectively such that capacity for digitized image data can be reduced. In this case, data amount can be reduced and thus high-quality and reusable electronic documents can be obtained, by binarizing areas such as character, line-drawing, and table, etc. as binary image area and vectorizing them with outlining process (hereinafter, also referred to as "outline vectorization").

As for binary image data vectorization, the applicant already proposed the Japanese Patent Publication No. 3026592. In this document, the following configuration is disclosed.

That is, a process is performed in which predefined positions are selected as those which make up a profile line based on the statuses of a pixel of interest and its neighboring pixels and then the connection direction of points is determined based on points and other points also making up the profile line. Then, a process is performed which determines the statuses of the connection between the points and other points also making up the profile line. Then, the location of the pixel of interest will be updated in raster scan order on the image data, and the above process is repeatedly performed with respect to each pixel of interest based on the statuses of the neighboring pixels, and finally, contour points are extracted. As for the above configuration, both the statuses of the pixel of interest and the neighboring pixels in the image data are retained, and the pixel of interest is extracted in raster scan order, and a horizontal and vertical inter-pixel vectors is detected based on the statuses of the pixel of interest and the neighboring pixels. The status of the connection between those inter-pixel vectors is determined, and the outline of the image data is extracted based on the statuses. The Japanese Patent Publication No. 3026592 proposed the method described above.

Since the method described in the Japanese Patent Publication No. 3026592 can extract all of the profile lines within an image in only one raster scan, and even does not need any image memory for storing all image data, it has an advantage of reduced memory capacity. Additionally, since the method extracts profile lines by pixel edge of an input image rather than by the center point thereof, it has promising width for a thin line of one pixel width. Furthermore, the document discloses that it can extract not only profile lines connected in four directions but also those connected in 8 directions in an original image.

In addition, the applicant disclosed in the Japanese Patent Laid-Open No. H05-108823(1993) that an efficient profile line extraction could be achieved by modularizing the vector extraction rule disclosed in the Japanese Patent Publication No. 3026592.

Meanwhile, the applicant also proposed the Japanese Patent Publication No. 3049672. In this document, an image processing device is disclosed which can obtain high-quality variable images using binary image profile information. In this proposition, outline vectors are extracted from a binary image, and the outline vectors are created by smoothly scaling the extracted outline vector at desired (arbitrary) magnification, and a binary image is regenerated from the scaled vectors. As a result, a high-quality digital binary image scaled at desired (arbitrary) magnification can be obtained. Note that as a way of extracting online vectors from a binary image, the above method disclosed in the Japanese Patent Publication No. 3026592 and the Japanese Patent Laid-Open No. H05-108823(1993) may be used, for example.

Additionally, the applicant also proposed the Japanese Patent Laid-Open No. 2005-346137. In this document, a processing method and device are disclosed which functionally approximate profile information with small data amount which represents high-quality variable images by performing not only straight-line approximation but also second- or third-order Bezier curve approximation. The high-quality variable image scaled at desired (arbitrary) magnification can also be obtained by using the online vectors which are created by extracting online vectors from a binary image and smoothly and functionally approximating the extracted vectors in the same way as described in the Japanese Patent Laid-Open No. 2005-346137. Here, as a way of extracting outline vectors from a binary image, the methods disclosed in the Japanese Patent Publication No. 3026592 or the Japanese Patent Laid-Open No. H05-108823(1993) described above may be used.

FIG. 2A to 2D illustrates exemplary process of an outline vectorization sequence for the above binary image. Specifically, the figures show data appearance in a sequence for obtaining high-quality digital binary image scaled at desired (arbitrary) magnification by using the online vectors which are created by extracting online vectors from a binary image and smoothly and functionally approximating the extracted vectors.

FIG. 2A illustrates an example of an input binary image. FIG. 2B illustrates an outline vector depicted and visualized as an outline image which can be extracted from the binary image in FIG. 2A with the method disclosed in the Japanese Patent Publication No. 3026592 or the Japanese Patent Laid-Open No. H05-108823(1993). FIG. 2C depicts and visualizes an outline vector obtained by smoothly and functionally approximating the extracted outline vector data with the method disclosed in the Japanese Patent Laid-Open No.

2005-346137. FIG. 2D illustrates an example of a high-quality digital binary image scaled at desired (arbitrary) magnification which can be obtained by middle-coating the leveled (functionally approximated) vector.

As previously described, due to growing demands on paperless, digitalization and reuse of existing image data are desired even for business documents. A type of reuse in which an original image is scaled at desired magnification, inter alia, can be achieved by the Japanese Patent Publication No. 3026592 or the Japanese Patent Laid-Open No. H05-108823 (1993) and the Japanese Patent Laid-Open No. 2005-346137. That is, it can be achieved by extracting the profile (outline) vectors from a binary figure in an original document and scaling its two-dimensional shape at arbitrary scaling rate.

An outline-vectorized electronic documents can be obtained by extracting profile lines obtained from a binary image and functionally approximating curves of the obtained profile lines with curve functions such as the Bezier curve, etc. as described above. Note here that when functionally approximating with such curve functions, typically, it is necessary to calculate a point sequence on a profile line and errors of the Bezier curve and to optimize the curve, resulting in possible significant repetitive operations and very long processing time.

As approximate calculation which might shorten the processing time, a method of interpolating profile points with a curve is contemplated. However, it might cause a problem that if curve interpolation is applied directly to the profile points, then the number of interpolation points might increase and thus compression effect of outline vectorization might be depleted. Additionally, if the number of interpolation points is cut down with straight-line approximation etc., another processing time would be needed for the approximation. That is, although data amount may be reduced with outline vectorization, large amount of operations and significant operation time would be needed for approximation calculation in the vectorization. Consequently, a problem would occur that enough reduction effect in data amount cannot be obtained even when trying to shorten the operation time with performing outline vectorization.

So the leveling (functional approximation) process of profile vectors in the Japanese Patent Laid-Open No. 2005-346137 described above basically determines anchor points which specify an interval to be functionally approximated with curve functions such as Bezier curve, etc. as described bellow. That is, the anchor points are determined based on the combinations of the direction or length of series of edge vector around the edge vector of interest. The Japanese Patent Laid-Open No. 2005-346137 arranges a profile point sequence in an interval divided by the anchor points such that the sequence approximated with the Bezier curve. In this way, significant repetitive operations traditionally performed for obtaining a point sequence on a profile line and optimizing the curve would not be necessary, and an outline vectorization is made possible which does not cost significant processing time such as in the prior art According to the Japanese Patent Laid-Open No. 2005-346137, vector leveling (functional approximation) is performed as follows. First, profile data, called rough profile data, composed of horizontal and vertical vectors aligning one after the other which are extracted from binary raster image data are entered, then tangential lines are computed from lines on the rough profile. Anchor points are extracted from the extracted tangential lines. Then, a straight-line is applied to the group of one or multiple lines between the extracted anchor points, or a second- or third-order Bezier curve is applied to them in order to perform Bezier curve approximation, and the above lines are replaced with the straight-line or second- or third-order Bezier curve.

Here, note that the method of functionally approximating profile points between anchor points as one group based on the points defined as anchor points is the basic means for functional approximation techniques. Also, anchor points have a characteristic that the positions (coordinate values) of the anchor points themselves do not change even if the interval defined by the points is functionally approximated with any of a second- or third-order Bezier curve or a straight-line.

According to the Japanese Patent Laid-Open No. 2005-346137, there are several conditions for extracting candidate vectors for tangential line segment:

the preceding vector and the next vector of the candidate vectors should be in opposite direction with respect to one another;

the candidate vectors should be adjacent to the extracted main tangential line segment, and the length of the vectors L1 should satisfy $L1 \geq \theta_4$;

the length of the vectors L2 should satisfy $L2 \geq \theta_5$ where $\theta_4$ and $\theta_5$ are predefined constants, respectively.

As for extraction of anchor points, new points are extracted on the extracted tangential line segments as anchor points. The anchor points are extracted for the both edges of the tangential line segment. Therefore, basically, two anchor points are extracted for one tangential line segment. However, if the two anchor points are the same, then one anchor point will be extracted. If two anchor points are extracted, the segment sandwiched between the anchor points are automatically interpolated with a straight-line on the object. As a way of extracting anchor points for the one edge of a tangential line segment, if a vector adjacent to the tangential line segment vector of interest is a tangential line segment, the end points of the adjacent vector will be anchor points. Otherwise, a point will be selected as an anchor point which is on the vector adjacent to the adjacent line segment, i.e., the vector $V_1$ (its length is represented as $|V_1|$) of the line segment that is two segments before the vector $V_2$ (its length is represented as $|V_2|$) of the tangential line segment of interest and which is distant by a $|V_2|$ from the end points on the $V_2$ vector.

Additionally, it is disclosed in the Japanese Patent Laid-Open No. 2005-346137 that functional approximation of the profile point sequence in the interval determined as described above can be performed as follows. First, as shown in FIG. 8 (corresponding to FIG. 19 of the Japanese Patent Laid-Open No. 2005-346137), take N points p1, p2, ..., pN which make up the profile line sequence in an interval to be functionally approximated by curve functions such as the Bezier curve, etc. where p1 and pN are the anchor points of the interval. Then, a point pf on the curve is determined which is farthest distant from the line segment p1pN connecting the anchor points p1 and pN. In order to easily perform functional approximation, the approximation is done such that the line segment C1C2 connecting control point is parallel to the line segment p1pN. Then, the control points C1 and C2 are determined such that the distance from the points C1 and C2 to the line segment p1pN is (4/3)×L, where L is the distance from the point pf to the line segment p1pN.

That is, when the coordinate value of pf is (pfx, pfy), using the coordinate values (p1x, p1y) of p1 and the coordinate values (pNx, pNy) of pN and the tangential vector p1C1 (pcx, pcy), the coordinate value (C1x, C1y) of C1 will be:

$C1x = K \times pfx + p1x$ $C1y = K \times pfy + p1y$ $$K=(3p1x-4pfx)(pNy-p1y)+(pNx-p1x)(4pfy-3p1y)+\\p1x(pNy-p1y)-p1y(pNx-p1x)/(3(pNy-p1y)pcx+3\\(pNx-p1x)pcy)$$

and can be uniquely determined by the coordinate of pf. Also, C2 can be determined in the same way as for C1. Note that the above dividing points are anchor points. Also, a tangential vector at the anchor points is determined by extracting a directional vector in a pattern matching manner from a combination of multiple line segments upon dividing into segment curves.

The above process is disclosed in the Japanese Patent Laid-Open No. 2005-346137.

In this way, the Japanese Patent Laid-Open No. 2005-346137 discloses a process which does not need any significant repetitive operations typically performed in the prior art for determining a point sequence on a profile line and errors of the Bezier curve and optimizing the curve. That is, outline vectorization is disclosed in the document which does not need any significant process time as in the prior art.

By the way, digital copy machines are being replaced by digital multi function peripheral equipments which have multiple functions such as image transmission, image storage, image copying, image printing, etc. These equipments are systematically composed of scanner units for reading document images, digital printer units, digital image data processing units, data sending and receiving units, data storage management units, etc. Having the electronic documents generation features described above, these equipments will contribute significantly to improvement in an office environment.

When these equipments have the electronic documents generation feature described above, device cost, processing time, etc. thereof must be limited for their practical use. Although it will be better if high-speed and high approximation accuracy vectorization is performed in relatively small data amount, there is certain tradeoff between speed, approximation accuracy, and data amount. That is, there is a tendency that if data amount is increased by increasing anchor points, then each interval for functional approximation can be narrowly created and generally more accurate functional approximation can be performed. Also, by increasing processing time, parts of comparatively less accurate vectorization may also be improved.

The profile vector leveling (functional approximation) disclosed in the Japanese Patent Laid-Open No. 2005-346137 is considered to be superior and a very useful technique in that it enables outline vectorization which does not needs any significant processing time such as in the prior art. That is, with the profile line leveling (functional approximation) described above, significant repetitive operations for obtaining a point sequence on a profile line and errors of the Bezier curve and optimizing the curve would not be necessary, and an outline vectorization which does not require significant processing time such as in the prior arts will be made possible. However, the technique disclosed in the document did not include a mechanism for optimizing data amount, processing time, and approximation accuracy in view of such tradeoffs.

The present invention, conceived to address the above problems, has an objective to provide a image processing device and image processing method to improve within the limitation of data amount the accuracy of Bezier approximation with relatively high-speed processing, and to improve the accuracy in pre-defined processing time. In other words, the purpose of the invention is to propose a specific processing configuration which enables vectorization based on functional approximation with improved accuracy relative to the traditional ones with some limitations of practical device configuration or processing time.

SUMMARY OF THE INVENTION

To solve the above problems, the image processing device of the invention includes: unit for obtaining rough profile vector data composed of a point sequence representing a figure as a sequence of straight-line; functional approximation interval configuring unit for configuring dividing points for dividing the point sequence of the obtained rough vector data into intervals for functional approximation; functional approximation unit for functionally approximating each configured functional approximation interval; intra-interval approximation accuracy calculation unit for calculating approximation accuracy for each of the functional approximation intervals; candidate interval-to-be-divided identification unit for identifying functional approximation intervals whose approximation accuracy should be improved in the multiple functional approximation intervals based on the calculated approximation accuracy; interval dividing unit for setting further multiple functional approximation intervals in the functional approximation intervals by dividing the intervals identified by the identifying unit; and determining unit for performing at least one of: determining whether data amount of data which includes at least the rough profile vector data with the dividing points and approximation accuracy of each functional approximation interval reaches the pre-defined data amount; and measuring elapsed time since the process started and determining whether the elapsed time exceeds the pre-defined time, and the device repeats the followings until it is determined by the determining unit that the data amount reaches the pre-defined data amount or the elapsed time exceeds the predetermined time: a process by the functional approximation unit for functionally approximating the function approximation intervals divided by the interval dividing unit; a process for calculating approximation accuracy by the intra-interval approximation accuracy calculation unit; a process for identifying the functional approximation interval obtained by the candidate interval-to-be-divided identification unit; and a process for dividing the identified functional approximation interval by the interval dividing unit.

Additionally, the image processing method of the invention includes: process for obtaining rough profile vector data composed of a point sequence representing a figure as a sequence of straight-line; functional approximation interval configuring process for configuring dividing points for dividing the point sequence of the obtained rough vector data into intervals for functional approximation; functional approximation process for functionally approximating each configured functional approximation interval; intra-interval approximation accuracy calculation process for calculating approximation accuracy for each of the functional approximation intervals; candidate interval-to-be-divided identification process for identifying functional approximation intervals whose approximation accuracy should be improved in the multiple functional approximation intervals based on the calculated approximation accuracy; determining process for performing at least one of: determining whether data amount of data which includes at least the rough profile vector data with the dividing points and approximation accuracy of each functional approximation interval reaches the pre-defined data amount; or measuring elapsed time since the process started and determining whether the elapsed time exceeds the pre-defined time; interval dividing process for dividing the functional approximation intervals into multiple functional approximation intervals by setting new dividing points in the functional approximation interval if it is determined by the determining process that the data amount is less than the pre-defined data amount or the elapsed time does not exceed the pre-defined time; second functional approximation process for functionally approximating each of the functional approximation intervals divided by the interval dividing process; second intra-interval approximation accuracy calculation process for calculating approximation accuracy for each of the functional approximation intervals functionally approximated by the second functional approximation process; and second candidate interval-to-be-divided identification process for identifying functional approximation intervals whose approximation accuracy should be improved based on the approximation accuracy calculated by the second intra-interval approximation accuracy calculation process.

According to the invention, a specific processing configuration may be implemented which enables vectorization based on functional approximation with improved accuracy relative to the prior art with some limitations of practical device configuration or processing time.

Further features of the present invention will become apparent from the following description of exemplary embodiments (with reference to the attached drawings).

BRIEF DESCRIPTION OF THE DRAWINGS

FIG. 10 is a diagram showing the relationship of FIG. 10A and FIG. 10B.

FIG. 10A is a block diagram showing an exemplary form of rough profile data with anchor points in accordance with an embodiment of the invention.

FIG. 12 is a diagram showing the relationship of FIG. 12A and FIG. 12B.

FIG. 12A is a block diagram showing an exemplary data form of error values in each functional approximation interval in accordance with an embodiment of the invention.

FIG. 14 is a diagram showing the relationship of FIG. 14A and FIG. 14B.

FIG. 14A is a block diagram showing an exemplary vector data form output at step S170 in accordance with an embodiment of the invention.

DESCRIPTION OF THE EMBODIMENTS

Figure 1:
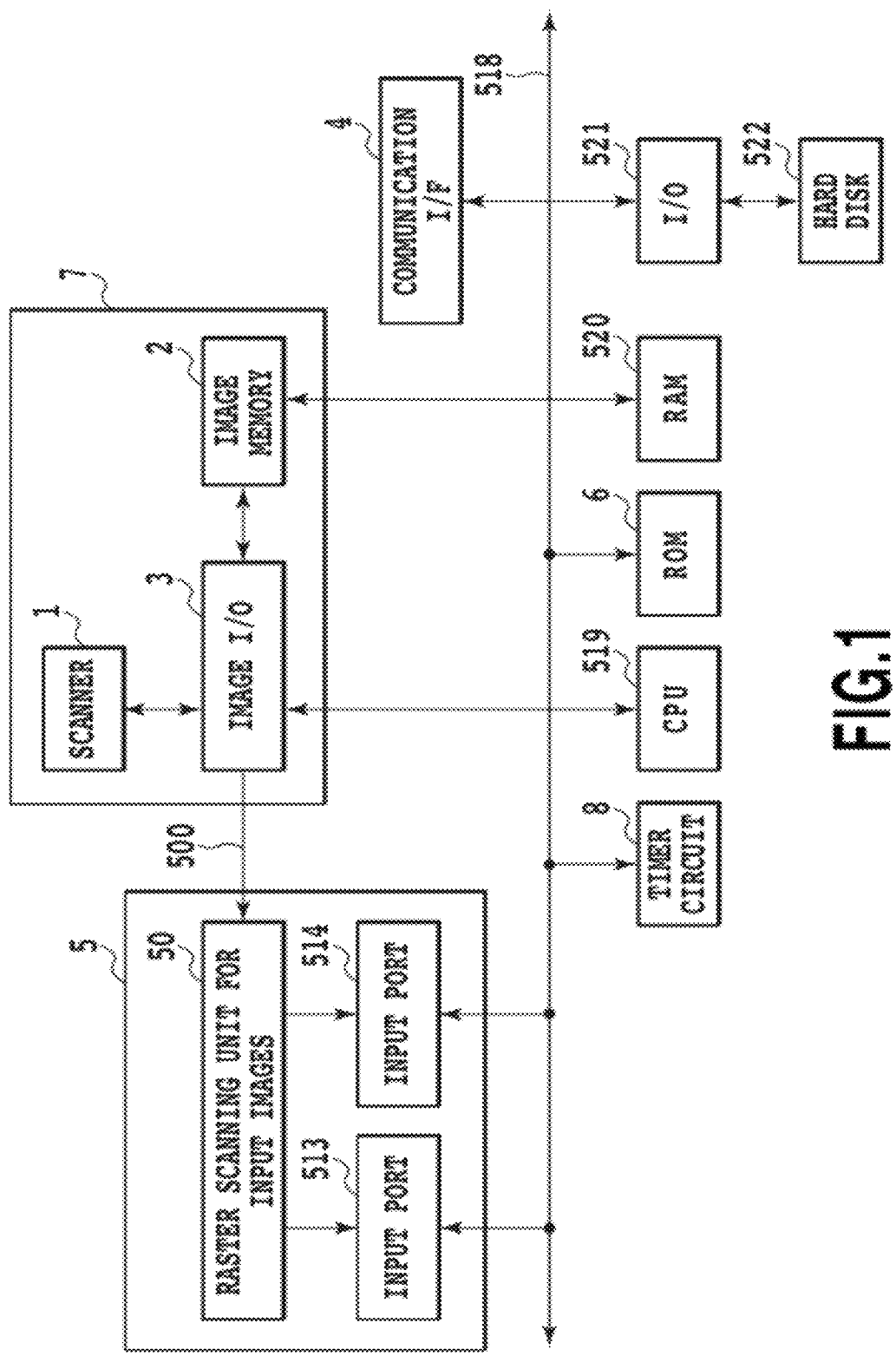
FIG. 1 illustrates an exemplary configuration of an apparatus implementing an image processing device in accordance with an embodiment of the invention.
Figure 2A:
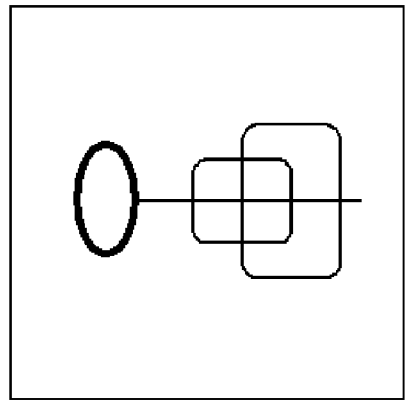
FIG. 2A to 2D illustrate an exemplary process of a conventional outline vectorization sequence for a binary image.
Figure 2B:
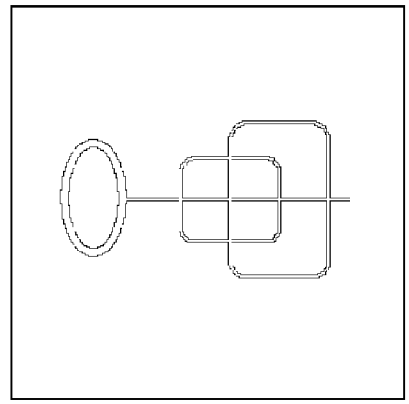
Figure 2C:
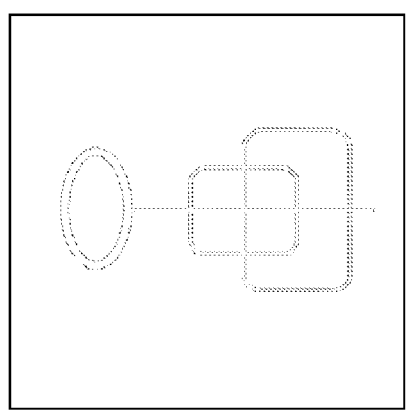
Figure 2D:
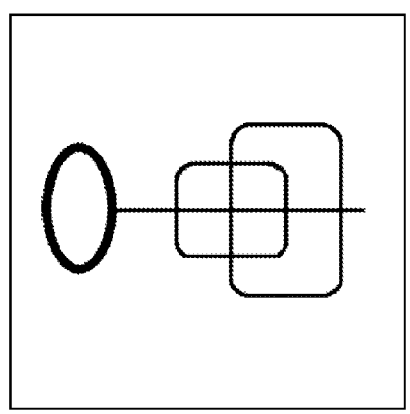

Embodiments of the present invention are described with reference to the following figures, wherein like reference numerals refer to like parts throughout the various views. In an embodiment of the invention, an image processing device obtains vector data (also referred to as rough profile vector data) composed of a point sequence representing a figure as a sequence of straight-line. In order to do this, for example, a candidate binary image for vectorization is obtained with a binary image obtaining unit, and the figure boundary contained in the binary image obtained by the obtaining unit is extracted with rough profile extraction unit as a set of vectors before functional approximation. The vectors are also referred to as rough profile or rough profile vector.

A functional approximation interval configuring (anchor point configuring) unit creates dividing points (anchor points) for dividing a point sequence on the rough profile obtained by the rough profile extraction unit into intervals for functional approximation with high-order curve function such as the Bezier curve, etc. A functional approximation (control point calculation) unit functionally approximates each of the function approximation intervals created by the functional approximation interval configuring (anchor point configuring) unit with curve functions such as the Bezier curve. An intra-interval approximation accuracy calculation (intra-interval error values or intra-interval maximum error) unit calculates the approximation accuracy of each of the functional approximation intervals which are functionally approximated with curve functions such as the Bezier curve, etc. by the functional approximation (control point calculation) unit.

A candidate interval-to-be-divided identification unit identifies, from the values of approximation accuracy of each of the functional approximation intervals calculated by the calculation unit, intervals whose approximation accuracy should be improved. An interval dividing unit divides intervals identified by the identification unit whose approximation accuracy should be improved into multiple functional approximation intervals. Each of the multiple intervals obtained by the dividing unit will be functionally approximated with curve functions such as the Bezier function, etc. by the functional approximation (control point calculation) unit.

The image processing device includes, in addition to each unit described above, at least one of a data amount determining unit and a processing time measuring unit described below.

The data amount determining unit determines whether data amount of the data reaches the pre-defined data amount, which is generated by replacing the functional approximation results in functional approximation intervals before dividing with each functional approximation result in the multiple function approximation intervals obtained as described above. If the pre-defined amount is not reached, the device performs the replacement. Furthermore, the intra-interval approximation accuracy calculation (intra-interval error values or intra-interval maximum error) unit again calculates approximation accuracy for each functional approximation results in the multiple functional approximation intervals. Then, the candidate interval-to-be-divided identification unit identifies other intervals whose approximation accuracy should be improved next. Otherwise, the above processes will not be performed and the vectorization will be terminated.

The processing time measuring unit measures the previous processing time, and determines whether it exceeds the pre-defined time. If the processing time exceeds the pre-defined time, the image processing device terminates the vectorization. Otherwise, i.e., if the processing time does not exceed the pre-defined time, the above process will be repeated.

The First Embodiment

FIG. 1 illustrates an exemplary configuration of an apparatus implementing an image processing device in accordance with an embodiment of the invention. In the figure, the reference number 518 represents a bus of the system.

The reference number 1 represents a scanner for inputting images. The reference number 2 and 3 represent an image memory and an image I/O, respectively. A binary image acquisition unit 7 functioning as a binary image obtaining unit includes the scanner 1, the image memory 2, and the image I/O 3. The image memory 2 maintains multi-value images (original image) before binarization read by the scanner 1 via the image I/O 3. Additionally, the input memory 2 maintains binary image data after binarization based on known binarization methods, such as binarization of the binary image using pre-defined thresholds.

Working together with a CPU 519 and ROM 6 described below, a rough profile extraction unit 5 functioning as a profile extraction unit extracts boundaries of a figure contained in the binary image obtained by a binary image acquisition unit 7 as a vector before functional approximation (also referred to as rough profile or rough profile vector) The reference number 50 represents a raster scanning unit for input images which inputs sequentially the binary image data obtained by the binary image acquisition unit 7 from a signal line 500 via the image I/O 3. The reference number 513 and 514 represent input ports for inputting each pixel status of the scan window composed of 3×3, 9 pixels.

The reference number 4 represents a communication interface communicating with the outside of the system via network etc. The reference number 519 represents a CPU. The reference number 520 represents a RAM of a working memory. The reference number 6 represents a ROM which stores programs executed on the CPU 519 according to procedures described below, and pre-defined parameters and data, etc. The CPU 519, RAM 520, and ROM6 work together to implement the functional approximation interval configuring (anchor point configuring) unit and the functional approximation (control point calculation) unit. Additionally, the intra-interval approximation accuracy calculation (intra-interval error values or intra-interval maximum error) unit, the candidate interval-to-be-divided identification unit, the interval dividing unit, the data amount determining unit, and the processing time measuring unit, etc. will also be implemented by the components. The reference number 521 represents an I/O (input and output circuit) for a hard disk 522. The reference number 8 represents a timer circuit which the CPU 519 controls to implement the processing time measuring unit. The CPU 519 controls each component of the image processing device, i.e., the binary image acquisition unit 7, the rough profile extraction unit 5, and the timer circuit 8 illustrated in FIG. 1 in a comprehensive manner.

In the followings, operations of an image processing device implementing the embodiments will be described with reference to a flowchart illustrated in FIG. 3. As shown in the figure, the device operates as follows after starting a process. At step S10, the binary image acquisition unit 7 receives a set of instructions to invoke operations via input operation units (e.g., keyboard or various buttons, not shown) from an operator, and then generates a binary image in the image memory 2 using the scanner 1, the image input and output I/O 3, and the known binarization methods described above. That is, according to the above instructions, the scanner 1 reads an original document to obtain the document image. Then, the binary image acquisition unit 7 obtains the image from the scanner 1, binarize it to obtain a candidate binary image for vectorization, and stores it in the image memory 2.

Next, at step S20, the above rough profile extraction unit 5 is activated, and rough profile vector data is generated from the binary image obtained at step S10 and is stored in the RAM 520. In the followings, operations and processing details of the rough profile extraction unit 5 will be mainly described with reference to FIG. 4 to 7.

Figure 5:
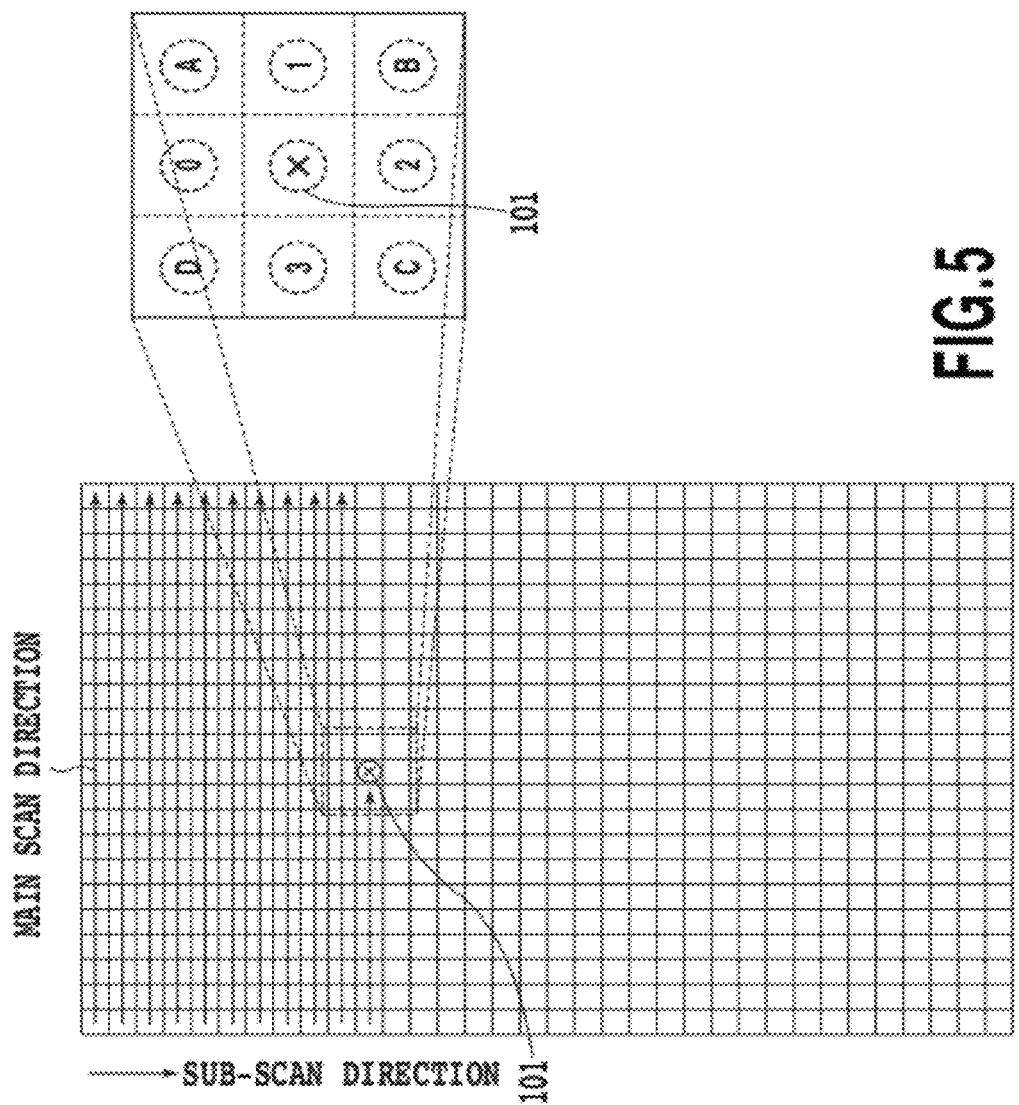
FIG. 5 illustrates how a process is performed based on the statuses of a pixel of interest and the neighboring pixels in a binary image in accordance with an embodiment of the invention.

In the embodiment, as shown in FIG. 5, each process is performed by looking at the statuses of a pixel of interest 101 and the 8 neighboring pixels in a binary image. The whole process for the image is performed pixel by pixel by raster-scanning the pixel of interest. In FIG. 5, "×" represents the pixel of interest 101, and positions represented as "0" and "2" are placed on the same positions as the pixel of interest 101 in the main scan direction indicating respectively a pixel (0) one raster before and a pixel (2) one raster ahead in the sub-scan direction. Positions represented by "1" and "3" are on the same raster as the pixel of interest 101, and represent respectively a pixel (3) one raster before and a pixel (1) one raster ahead. Furthermore, "A" and "B" are placed at the position one pixel ahead in the main scan direction, and represent respectively pixels at one raster before and one raster ahead. "C" and "D" are pixels at a position one pixel before in the main scan direction, and represent respectively pixels at one raster before and one raster ahead.

Figure 4:
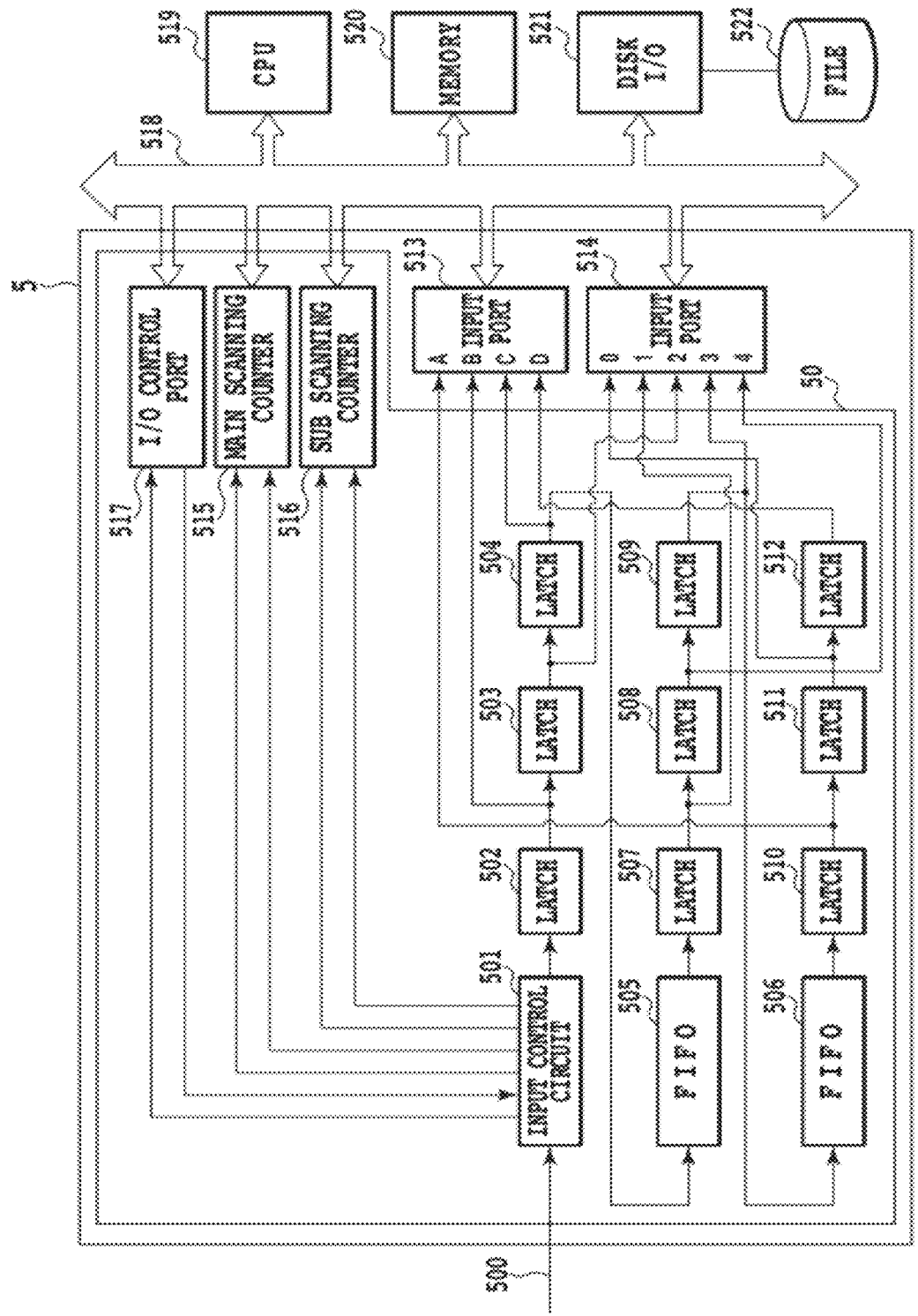
FIG. 4 illustrates in detail the exemplary configuration of the rough profile extraction unit 5 of FIG. 1.

FIG. 4 illustrates in detail the exemplary configuration of the rough profile extraction unit 5 of FIG. 1. In the figure, in the same way as in FIG. 1, the reference number 50 represents a raster scanning unit for input images, which sequentially takes binary image data inputs from the signal line 500 via the image I/O 3.

The reference number 501 represents an input control (interface) unit for exchanging image data (binary images) input from the binary image acquisition unit 7 via the signal line 500. Binary data are input sequentially in a raster scanning manner from the signal line 500. The reference number 502 represents a latch which holds image data input from the input control circuit 501 with each pixel sequentially updated in synchronization with an image synchronization clock not shown in the figure. At the next image synchronization clock, the latch 502 takes next image data from the input control circuit 501. At that time, image data already held in the latch 502 will be latched into and held in a latch 503 in synchronization with its image synchronization clock. Similarly, the image data held in the latch 503 in turn will be held in the latch 504 at the next image synchronization clock.

The reference number 505 and 506 represents first-in first-out (FIFO) memories storing image data for one raster scanning, respectively. The FIFO 505 sequentially incorporates outputs of the latch 504 in synchronization with the image synchronization clock, and outputs data one raster before into a latch 507. In a similar manner, the FIFO 506 incorporates outputs of a latch 509, and outputs image data one raster before into a latch 510. The latch 507, 508, and 509 as well as the latch 510, 511, and 512 also operate in the same way as the above latch 502, 503, and 504.

The 9 pixels stored respectively in the latch 502, 503, 504, 507, 508, 509, 510, 511 and 512 as described above correspond to pixel data of an area composed of 9 (i.e., 3×3) pixels illustrated in FIG. 5. That is, these latched data correspond respectively to "B", "2", "C", "1", "×", "3", "A", "0", "D" in the order of the latch 502 to 512.

The reference number 513 and 514 are input ports for inputting each pixel status of a scanning window composed of 3×3, i.e., 9 pixels. The input ports 513 and 514 are both input ports of the CPU 519. The input port 513 inputs data of the latch 510, 502, 504 and 512, that is, data at "A", "B", "C" and "D" in FIG. 5 into the CPU 519. Similarly, the input port 514 inputs data of the latch 511, 507, 503, 509 and 508, that is, data at "0", "1", "2", "3" and "×".

The reference number 515 represents a scanning counter for indicating a pixel position in the main scan direction. The counter is reset by the sub scanning synchronization signal not shown in the figure, and counted up by a pixel synchronization signal. The reference number 516 represents a sub scanning counter for indicating a pixel position in the sub-scan direction. The counter is reset by a page synchronization signal not shown in the figure, and counted up by a sub scanning synchronization signal. The reference number 517 represents an I/O port for I/O control. The port holds a signal which instructs the I/O control circuit 501 to execute or suspend inputting image data, and a signal from the I/O control circuit 501 to the CPU 519 which notifies the circuit of update of image data, etc. The reference number 521 represents an I/O control device for the hard disk 522. The I/O control port 517, the main scanning counter 515, the sub scanning counter 516, the input port 513 and 514, the memory 520, and the disk I/O 521 are all connected to the CPU 519 via the bus 518.

In this way, the CPU 519 updates pixel data through the I/O control port 517, and can know the position of the pixel of interest (i, j) through the main scanning counter 515 and the sub scanning counter 516. Additionally, the CPU can also know the statuses of the pixel of interest and the neighboring pixels in 8 directions trough the input port 513 and 514.

After processing the pixel of interest as described above, the CPU 519 instruct updating of pixel data stored in the 9 latches via the I/O control port 517, and at the same time, resets an update completion signal of the pixel data. When the I/O control circuit 501 receives the update instruction, it clears the update instruction signal for the pixel data and updates pixel data to be latched into subsequent latches. After the update is completed, the circuit outputs the update completion signal into the I/O control port 517.

After outputting the update instruction, the CPU 519 monitors the entry the update completion signal from the I/O control port 517. When the signal is entered, a process for new pixel data stored in the 9 latches will be performed, and thereafter the process will be repeated in the same way. In addition, the I/O circuit 501 outputs a completion signal into the port 517 on completion of processing the last pixel of the image area as a pixel of interest.

Now, processes according to the statuses of a pixel of interest and the neighboring 8 pixels will be described. If the pixel of interest is a white pixel, the CPU 519 aborts the process and forwards the raster scan by one pixel, and updates the position of the pixel of interest.

The start points and end points of these profile vectors are placed in the middle of pixels in both the main scan direction and sub-scan direction. Additionally, in both directions, pixel positions are specified by two-dimensional coordinates of positive numbers. However, note that for convenience, in order to avoid decimal number representations, any pixel positions will be represented with even numbers, and the start points and end points will be represented with odd numbers hereinafter. That is, an image of m×n pixels can be represented as a coordinate of positive even (integer) number of 2m×2n. In this way, if two-dimensional coordinates in which the main scan direction corresponds to the x coordinate and the sub-scan direction to the y coordinate, binary images can be represented as described below. That is, the image is made up of m×n pixels (both m and n are integer numbers) constructed by n raster of m pixels, and the i-th pixel position in the j-th raster can be represented as (2i, 2j) (i and j are both an integer number, where i≦m, j≦n). Also, the positive direction of the main scan direction (the x coordinate) is defined as left to right, and that of the sub-scan direction (the y coordinate) is defined as up to down.

Figure 6:
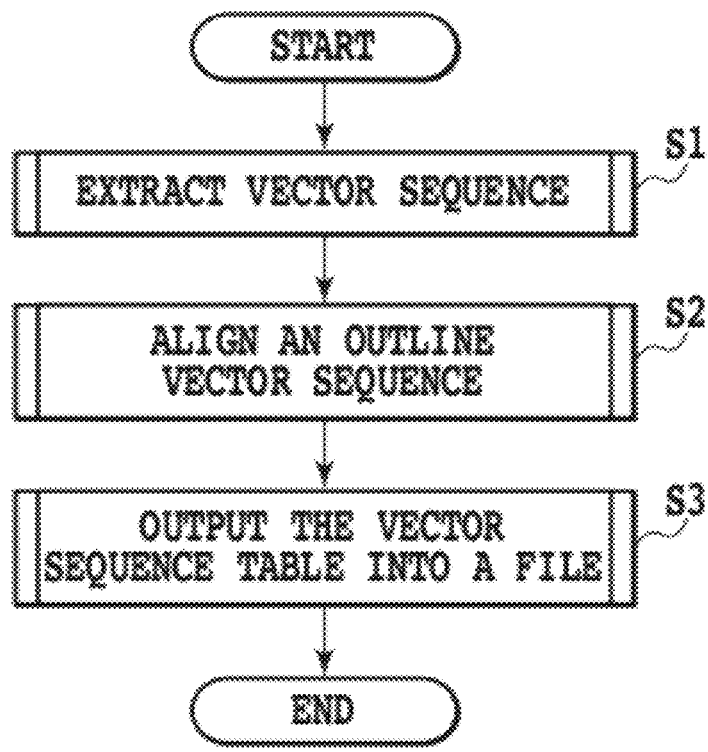
FIG. 6 illustrates a flowchart of the whole profile extraction process in accordance with an embodiment of the invention.

In the followings, for the rough profile extraction, the rough profile extraction unit 5, and a set of operations of the CPU 519 performed by the programs stored in the ROM 6 will be further described in accordance with the flowchart illustrated in FIG. 6. The rough extraction unit 5 according to the embodiment can be constructed basically with the rough extraction operations disclosed in the Japanese Patent Publication No. 3026592.

FIG. 6 illustrates a flowchart of the whole profile extraction process by the CPU 519 of an image processing device according to the embodiment. This flowchart is disclosed in FIG. 22 of the Japanese Patent Publication No. 3026592.

First, a vector sequence is extracted from binary image data at step S1. Then, coordinates of the start point of each vector, vectors flowing in the vectors (whose start point coordinate is on the same position as the end point of the vectors), and vectors flowing out of the vectors (whose end point coordinate is on the same position as the start point of the vectors) are output. This is done according to the Japanese Patent Publication No. 3026592 (tables illustrated in FIGS. 23 and 24 in the Japanese Patent Publication No. 3026592).

Next at step S2, item numbers of the flow-in and flow-out vector are tracked from the tables (not shown) in FIGS. 23 and 24 of the Japanese Patent Publication No. 3026592. With this process, a table storing the total number of profile line loops, the total number of points on the loops for each profile line loop, and x and y coordinate of each point on the profile line loops in the image illustrated in FIG. 7 (corresponding to FIG. 25 of the Japanese Patent Publication No. 3026592) will be created. Then at step S3, the table information is stored in the hard disk 522 in a file format thorough the disk I/O 521 to complete the operations.

Figure 3:
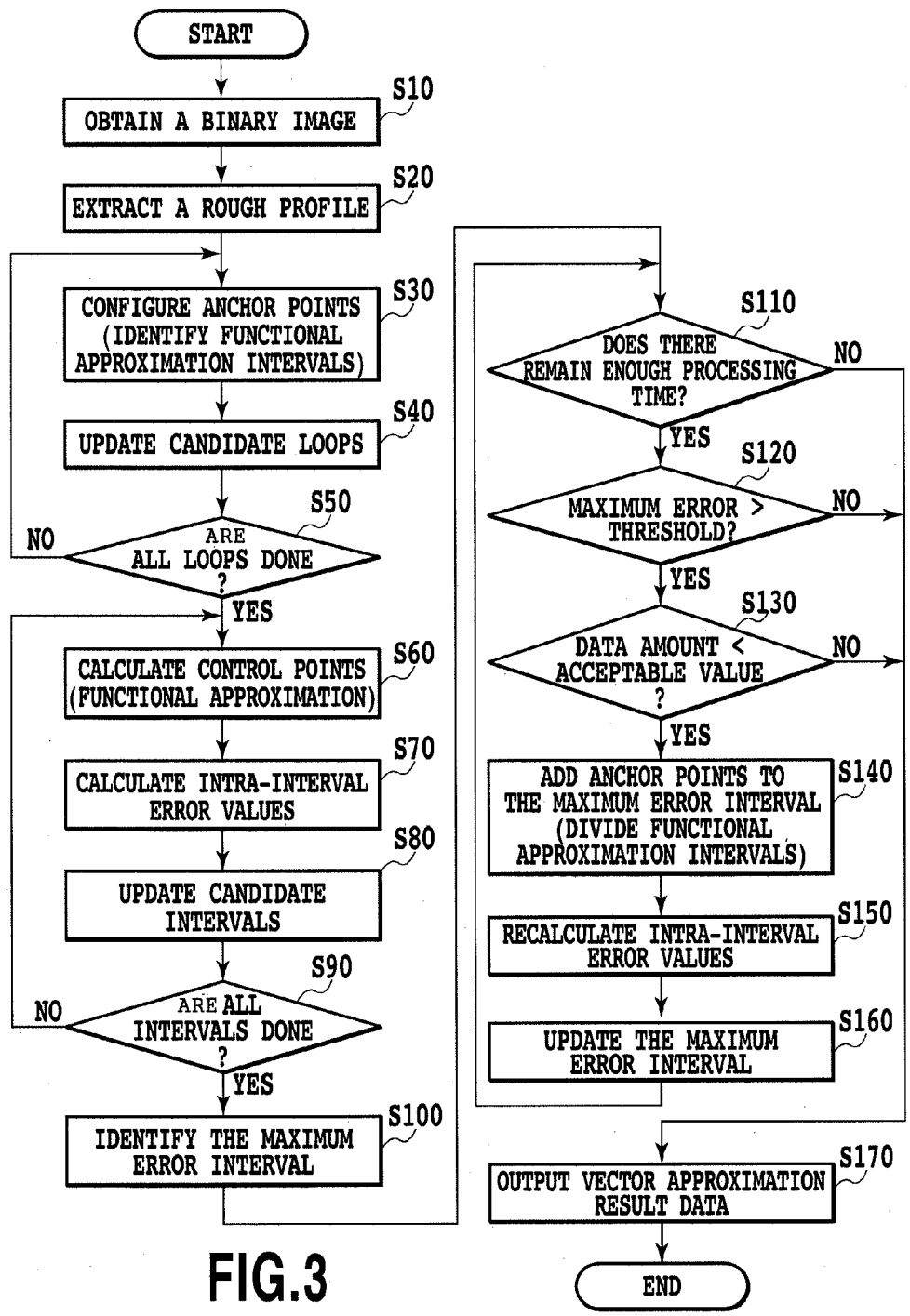
FIG. 3 is a flowchart which shows a process sequence of an image processing device in accordance with an embodiment of the invention.
Figure 7:
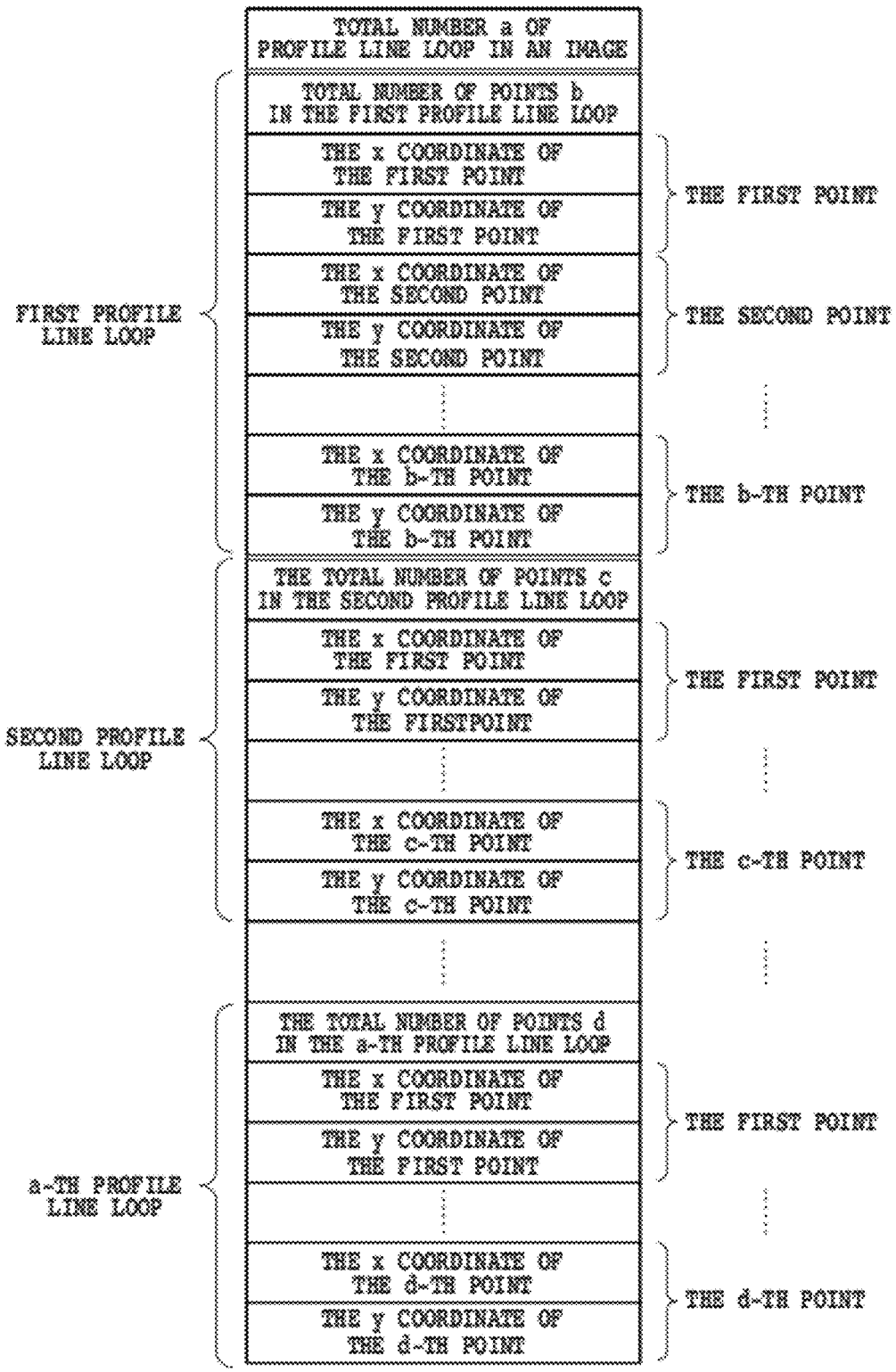
FIG. 7 illustrates an exemplary form of rough profile vector data in accordance with an embodiment of the invention.

In this way, after the profile line extraction at step S20 in FIG. 3 is completed, the CPU 519 stores the created profile line vector data in the hard disk 522. The rough profile vector data can be represented in a format as shown in FIG. 7, and in the embodiment, the data will be output in the format. Note that the rough profile vector data stored in the hard disk 522 are vectors before functional approximation.

In this way, the image processing device can extract figure boundaries contained in the binary image as vectors before functional approximation from the binary image obtained at step S10.

At step S30, the CPU 519 functions as a functional approximation interval configuring unit, and configures anchor points for functionally approximating the rough profile vector data stored in the hard disk 522 with the Bezier curve. The CPU 519 can configure functional approximation intervals by configuring the anchor points.

The intervals can be obtained, for example, with the methods disclosed in the Japanese Patent Laid-Open No. 2005-346137 described above. Specifically, a rough profile vector data is defined as a vector in which horizontal and vertical vectors extracted from binary raster image data aligns one after another. Rough profile vector data for one profile line loop is selected and entered. Tangential line segments are extracted from line segments on a profile line based on the extraction condition (1) to (3) for a vector candidate for the tangential segment described above. Anchor points are extracted for two end points of the extracted tangential line segment. For one end point on the segment, if the vector adjacent to the tangential line segment of interest is a tangential line segment, the end point will be selected as anchor points. Otherwise, a point which is on the vector $V_1$ (its length is represented as $|V_1|$) two lines before the tangential line segment vector $V_2$ (its length is represented as $|V_2|$) of interest and is distant by a $|V_1|$ from the end points on a $V_2$ vector will be selected as an anchor point. However, if anchor points of each end point on one tangential line component coincide, only one anchor point will be extracted. In this way, after extracting all anchor points on rough profile data for one profile line loop, the flow goes to step S40.

At step S40, the CPU 519 changes the processing target to a profile line loop not yet processed in the profile vector data. At step S50, the CPU 519 moves the process forward to step S60 if there exists no such loops at step S40. Otherwise, the process goes back to step S30, and process at step S30 will be performed for the loops found at step S40.

Figure 10B:
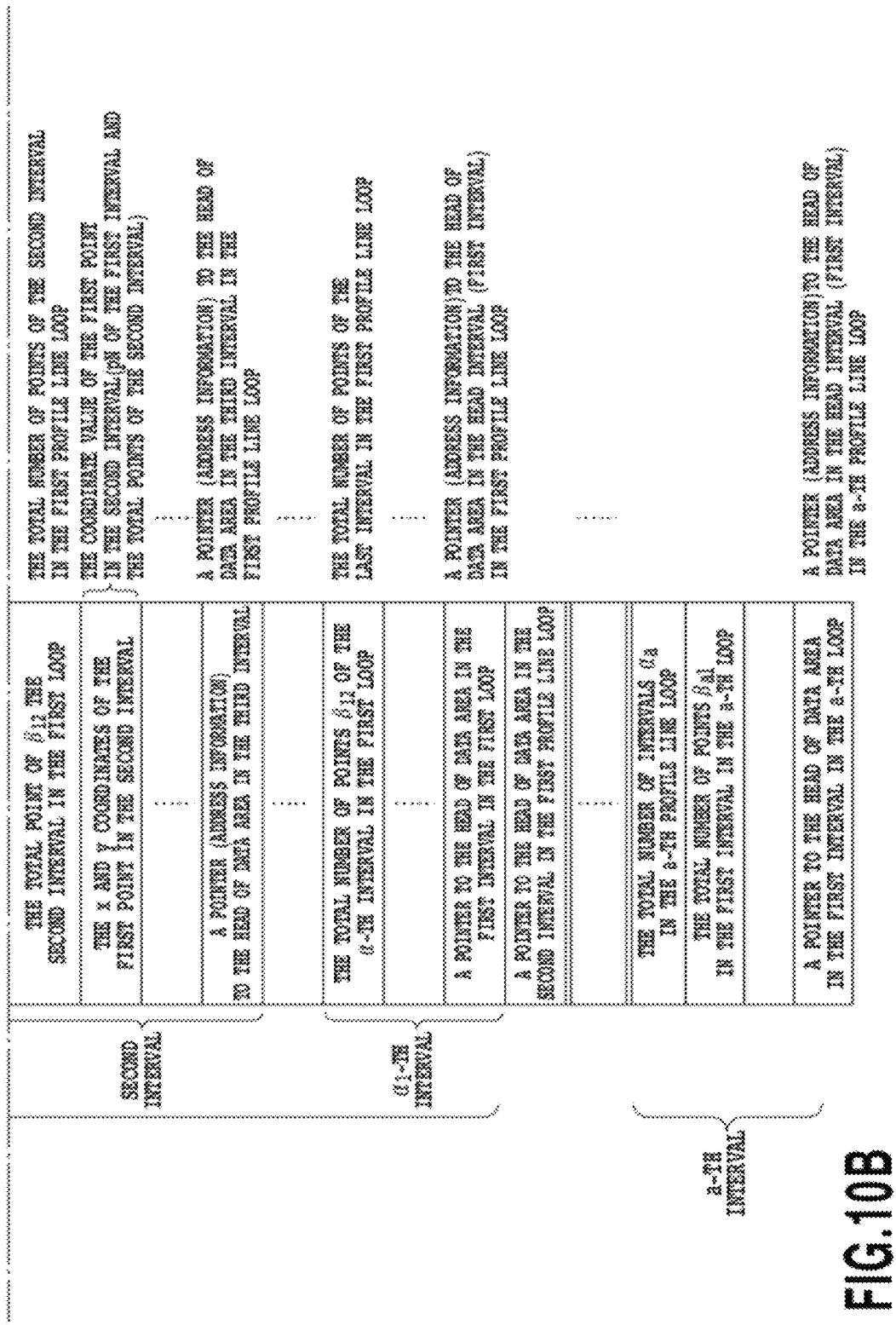
FIG. 10B is a block diagram showing an exemplary form of rough profile data with anchor points in accordance with an embodiment of the invention.

In this way, the process from step S30 to S50 are repeated until the anchor points configuring process are completed for all profile line loops. After completion, the flow goes to step S60. Note that the rough profile vector data for which anchor points obtained by the process from step S30 to S50 are configured (also referred to as "rough profile with anchor points" hereinafter) will be stored in the RAM 520 in the form as shown in FIG. 10. In FIG. 10, the total number of profile line loop in image a is stored in the head of a data area, and data for the first profile line loop (the first profile line loop) is stored at the next position. At the head of the data of the first profile line loop is stored the total number of candidate functional approximation intervals (also referred to as functional approximation intervals for short) in the first profile line loop, that is, the total number $\alpha_1$ of intervals sandwiched between adjacent two anchor points on the loop. At the next position is stored the total number $\beta_{11}$ of profile points in the first interval of the first profile line loop. This $\beta_{11}$ will be described in more detail below. At the further next position, the coordinate of the first profile point of the first interval in the first profile line loop is stored. The first profile point is the first anchor point (which corresponds to p1 in FIG. 8) of the two anchor points which define the functional approximation interval. In the subsequent segment of the data, the coordinates of remaining anchor points in the interval are sequentially stored according to their order on the loop.

Note here that the other anchor point (which corresponds to pN in FIG. 8) defining the functional approximation interval is also in fact the first anchor pint of the function approximation interval next to the interval within the same profile line loop. Therefore, the other anchor point in the functional approximation interval (i.e., the first interval) is generated by storing its coordinate as the first anchor point in the second interval connected to the interval. In other words, profile points in the first interval are stored as coordinates of profile points from the first anchor point defining the interval to the preceding point of the last anchor point defining the same interval. The example shown in FIG. 10 indicates that in the first functional approximation interval of the first profile line loop, there are $\beta_{11}$ profile line points from the first anchor point to the preceding point of the last anchor point defining the interval. This is what the total number of profile points in the first interval of the first profile line loop described above means.

Now, in the next area of the area storing the coordinates of the first profile points, information identifying the most distant point (which corresponds to pf in FIG. 8) from the line segment connecting anchor points in the functional approximation interval is stored. The information is herein a number specifying any of the second point to the $\beta_{11}$th point from the second point in the first interval. The following area stores coordinates of two control point C1 and C2 for the interval also not yet obtained at this time. The pf, C1, and C2 can be calculated at subsequent step S60.

The further following area includes a pointer (address information) providing the head position of the data area of the next functional approximation interval (in this case, the second functional approximation interval in the first profile line loop) in the same profile line loop. Hereinafter, the data of the second functional approximation interval, that of the third functional approximation interval, . . . , and that of the $\alpha_1$th functional approximation interval are aligned in that order in the same way as for the data sequence the first approximation interval so that the data about the first profile line loop can be created. In this case, there is an area in the tail of the data area of the first profile line loop which stores a pointer (address information) providing the head position of the data area for the second profile line loop. The area may be omitted if the profile line loop is the last profile line loop of the rough profile with anchor points. Subsequently, the data area for the second profile line loop having exactly the same structure follows the data area for the first profile line area described above. The rough profile with anchor points is thus configured by further repeating the above data area chain to the data area of the last profile loop existing in the rough profile with anchor points.

Note that when proceeding to step S60 after the process at step S50 is completed for all profile line loops, the above rough profile vector data illustrated in FIG. 7 may be deleted at this time from the hard disk 522 since it is no longer needed in the following processes.

Now, referring to step S60, the CPU 519 functions as a functional approximation (control point calculation) unit, and functionally approximates with high-order function (curve functions such as the Bezier function, etc.) each functional approximation interval configured at step S30 to calculate control points. Specifically, the CPU 519 takes data of one profile line loop in the rough profile with anchor points obtained by the processes from step S30 to S50, which is held in the above format shown in FIG. 10 in the RAM 520. Then, control points are obtained for intervals (hereinafter, referred to as "candidate functional approximation interval) sandwiched between two anchor points adjacent on the loop. Then, by applying second- or third-order Bezier curves or straight-lines to the interval to execute a Bezier curve approximation, all candidate functional approximation intervals on the profile line loop may be replaced with the second- or third-order Bezier curves.

Figure 8:
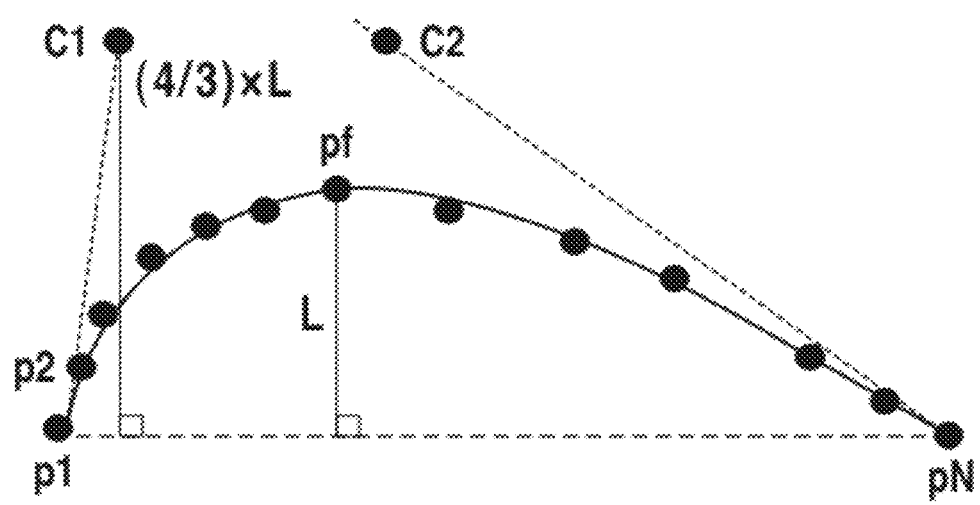
FIG. 8 illustrates an exemplary candidate functional approximation interval used in the prior art.

The above can be done with the methods disclosed in the Japanese Patent Laid-Open No. 2005-346137 described above. That is, first, take rough profile with anchor points of one loop, let candidate functional approximation intervals be candidate functional approximation intervals of interest sequentially in the connection order on the loop, and finally let the N points of the profile point sequence in the defined candidate functional approximation intervals be p1, p2, ..., pN, respectively. Here, both the start point p1 and end point pN of the point sequence are anchor points in the intervals. FIG. 8 illustrates an example in this context. In the same figure, each black circle represents each profile point.

At this point, a point pf on the curve is determined which is farthest distant from the line segment p1pN connecting the anchor points p1 and pN. Then, let L be the distance between the point pf and the line segment p1pN. In order to make it easy to perform functional approximation, the process is done such that the line segment C1C2 connecting control points is parallel to the line segment p1pN, where C1 and C2 are both control points to be obtained. Then, C1 and C2 are determined such that the distances from the points C1 and C2 to the line segment p1pN are each (4/3)×L, that is, the distance between the line segment C1C2 and p1pN parallel to each other is (4/3)×L.

When the coordinate value of pf is represented as (pfx, pfy), using the coordinate value (p1x, p1y) of p1 and the coordinate value (pNx, pNy) of pN and the tangential vector p1C1 (pcx, pcy), the coordinate value (C1x, C1y) may be calculated and uniquely determined by the coordinate of pf as follows:

$$C1x = K \times pfx + p1x$$

$$C1y = K \times pfy + p1y$$

$$K = (3p1x - 4pfx)(pNy - p1y) + (pNx - p1x)(4pfy - 3p1y) + p1x(pNy - p1y) - p1y(pNx - p1x) / (3(pNy - p1y)pcx + 3(pNx - p1x)pcy)$$

Also, the coordinate value of C2 may be calculated in a similar manner.

Note here that in this case, the maximum distance from the line segment p1pN to the point on the third-order Bezier curve defined by four points of the anchor points p1 and pN, and the control points C1 and C2 determined between the anchor points equals to the distance L to the point pf.

Note here that, as disclosed in the Japanese Patent Laid-Open No. 2005-346137, tangential vectors at the anchor points p1 and pN can be obtained as follows. That is, upon dividing into segment curves, the tangential vectors are determined by extracting a directional vector in a pattern matching manner from a combination of tangential line segments on determining anchor points and multiple line segments nearby the segments.

The information obtained at step S60 identifying the point (which corresponds to pf in FIG. 8) in the candidate functional approximation interval (functional approximation interval) farthest distant from the line segment connecting anchor points in the interval, is stored in the corresponding area illustrated in FIG. 10 described above. Similarly, the coordinates of the control point C1 and C2 are also stored in their corresponding area illustrated in FIG. 10 described above.

After finishing the control point configuration (functional approximation) at step S60 as described above, the flow goes to step S70.

Figure 9:
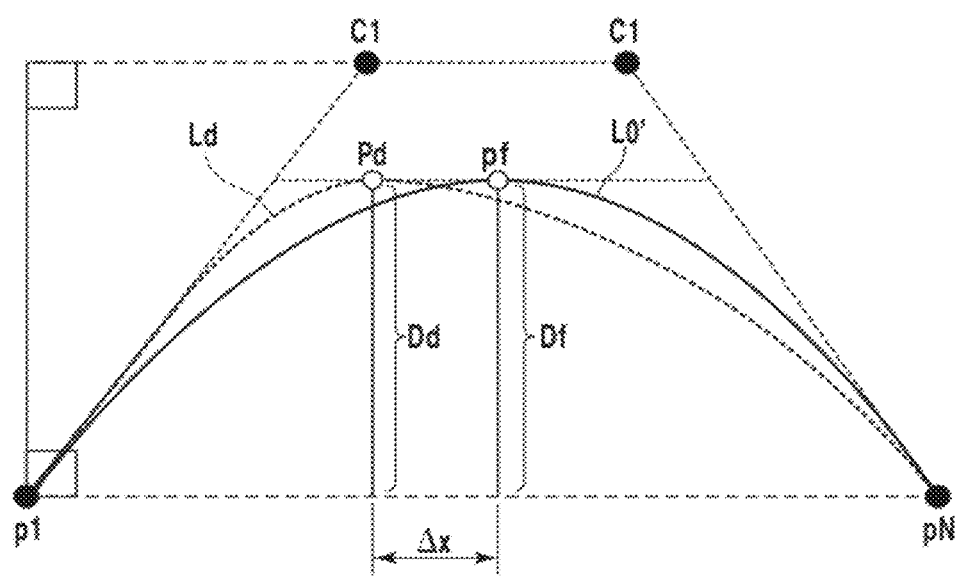
FIG. 9 illustrates an approximation error in a candidate functional approximation interval after functional approximation in accordance with an embodiment of the invention.

At step S70, the CPU 519 functions as an intra-interval approximation accuracy calculation unit, and calculates intra-interval error (approximation accuracy) of intervals in which functional approximation is completed at step S60. FIG. 9 illustrates the calculation. The figure shows that a third-order Bezier curve defined by four points of the anchor points p1 and pN, and the control points C1 and C2 determined between the anchor points is represented by a dashed line Ld. In the figure, each coordinate of p1 and pN is respectively represented by (p1x, p1y) and (pNx, pNy), and each coordinate of C1 and C2 is represented by (C1x, C1y) and (C2x, C2y). In this case, by calculating arbitrary points Pld (Pldx,Pldy) on Ld using a parameter t ($0 \leq t \leq 1$), the locus of Ld can be represented as follows:

$$Pldx = p1x(1-t)^3 + 3C1x(1-t)^2 t + 3C2x(1-t)t^2 + pNxt^3 \quad (1)$$

$$Pldy = p1y(1-t)^3 + 3C1y(1-t)^2 t + 3C2y(1-t)t^2 + pNyt^3 \quad (2)$$

Here, considering a relationship between Pld and pf (pfx, pfy) on the curve which is farthest distant from the line segment p1pN connecting the anchor points p1 and pN is obtained at step S60, the followings hold true. That is, C1 and C2 are determined such that the line segment C1N2 connecting two control points is parallel to the line segment p1pN, and the distance between C1C2 and p1pN is (4/3)×L. Therefore, when t=1/2, Pld equals to a point Pd (Pdx, Pdy) which has farthest distance (L) from the line segment p1pN. In FIG. 9, Dd and Df respectively represent distances from the point Pd and pf to the line segment p1pN, and $$Dd = Df = L$$

However, as whether the point Pd and pf perfectly coincides depends on ways of selecting tangential directions (tangential vector p1C1 or tangential vector p2C2) etc., there might be an error between the points. The error is represented as $\Delta x$ in FIG. 9:

$$(\Delta x)^2 = (Pdx - pfx)^2 + (Pdy - pfy)^2 \quad (3)$$

$$\Delta x = \text{SQRT}((Pdx - pfx)^2 + (Pdy - pfy)^2) \quad (4)$$

where SQRT (k) means a square root of k. Here, as described above, Pdx and Pdy can be obtained by substituting t=1/2 for the equation (1) and (2) respectively.

For simplifying the computation, assume that the point p1 is placed on the origin, (0,0) of the coordinate system and the point pN is on the x axis with its coordinate (pNx,0). In addition, assume that the coordinates of the point C1 and C2 are (C1x, (4/3) L) and (C2x, (4/3) L) respectively. Based on the assumptions, the point Pd (Pdx, Pdy) can be obtained from the above equations (1) and (2):

$$Pdx = (3/8)(C1x + C2x) + (1/8)pNx$$

$$Pdy = (3/8)(C1y + C2y) = (3/8)((4/3)L + (4/3)L) = L$$

Therefore, it can be understood that the point is certainly distant from the line segment p1pN by L.

Note that when substituting t=1/2 for the equation (1) and (2), the following relationship can be generally obtained.

$$Pdx = (1/8)p1x + (3/8)(C1x + C2x) + (1/8)pNx \quad (5)$$

$$Pdy = (1/8)p1y + (3/8)(C1y + C2y) + (1/8)pNy \quad (6)$$

Next, at step S70, the CPU 519 obtains the coordinate (Pdx, Pdy) of the point Pd using the equation (5) and (6) from the coordinates of the four points, p1, C1, C2, pN obtained at step S60. Additionally, the CPU 519 obtains $(\Delta x)^2$ using the equation (3) from the coordinate (pfx, pfy) of the point pf obtained at step S60. This $(\Delta x)^2$ may be used for the intra-interval error obtained at step S70. Alternatively, $\Delta x$ may also be used for the error. In this way, an image processing device can calculate intra-interval error (approximation accuracy) for each functional approximation interval functionally approximated with a third-order Bezier curve at step S60.

Note that basically the intra-interval error values calculated at step S70 will be stored in the RAM 520 in the order of processing at step S70 as described below. After calculating intra-interval error values at step S70, the flow goes to step S80.

At step S80, the CPU 519 changes the processing target to candidate functional approximation intervals not yet processed within an rough profile with anchor points for one profile line loop in processing. If there is no such candidate functional approximation intervals, the CPU 519 will change the processing target to candidate functional approximation intervals not yet processed in rough profile with anchor points loops not processed yet.

At step S90, the CPU 519 moves to step S100 if any profile line loop not yet processed is not found in the rough profile with anchor points at step S80. Otherwise, the CPU 519 goes back to step S60, and performs the above process of step S60 for the profile line loops not yet processed which are found at step S80.

In this way, the processes from step S60 to S90 will be repeated until the calculation of intra-interval error values is completed for all profile line loops in the rough profile with anchor points loop, and after completed, the flow goes to step S100. Note that resulting data from the calculation of intra-interval error values are stored, for example, in the RAM 520 in a format illustrated in FIG. 12. That is, as illustrated in FIG. 12, according to the order of processing at step S70, the data is stored such that each interval and intra-interval error values therein can be correlated by, for example, storing the data in the order of intervals of the profile line loop for each profile line loop.

Figure 12B:
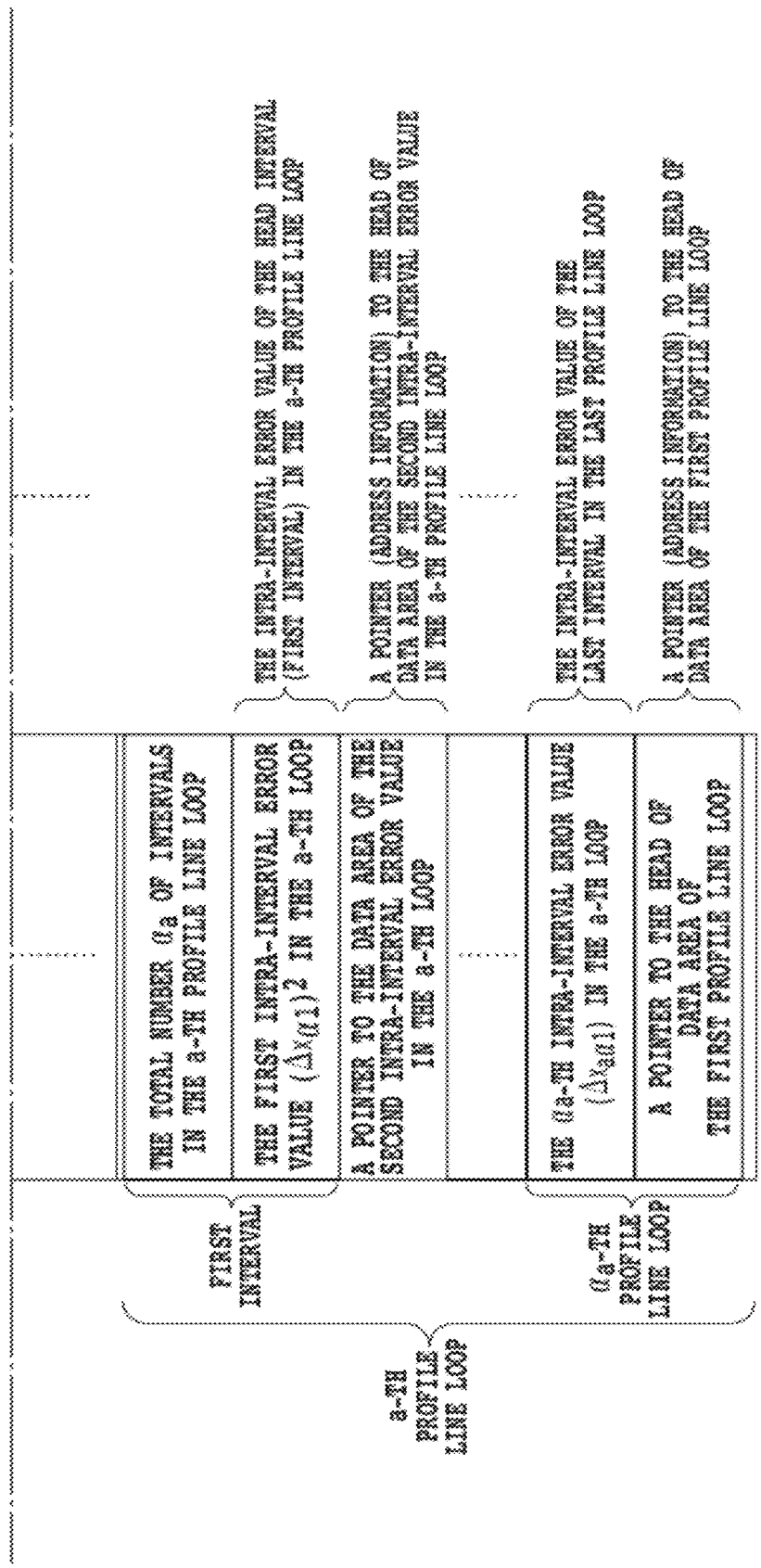
FIG. 12B is a block diagram showing an exemplary data form of error values in each functional approximation interval in accordance with an embodiment of the invention.

In FIG. 12, following the total number of profile line loops a in an image, data area of the first profile line loop to that of the a-th profile line loop are aligned sequentially. In the data area of the first profile line loop is stored the total number $\alpha_1$ of approximated intervals in the first profile line loop. In the next area, the intra-interval error of the first functional approximation interval in the profile line loop and a pointer (address information) to an area for storing intra-interval error of the next (i.e., the second) functional approximation interval are stored. Subsequently, the intra-interval error of the second functional approximation interval and a pointer (address information) to an area for storing intra-interval error of the next (i.e., the third) functional approximation interval are stored sequentially.

In the same way hereinafter, intra-interval error of the last functional approximation interval in the profile line loop followed by a pointer (address information) to an area storing data of the next (i.e., the second) profile line loop is stored, and now the data area of the first profile line loop configuration is completed. Subsequently, in the same way, data of the a-th profile line loop is configured. However, for convenience, in a pointer (address information) area next to the area storing intra-interval error of the last functional approximation interval of the last profile line loop is stored a pointer (address information) to the area storing data of the first profile line loop.

At step S100, the CPU519 identifies the maximum intra-interval error by obtaining the maximum values among intra-interval errors obtained at step S70 using the pointer information for data for each interval. That is, the CPU 519 functions as a candidate interval-to-be-divided identification unit, and identifies the functional approximation interval (the maximum error interval) having the maximum intra-interval error value (intra-interval maximum error value) from intra-interval error values for each functional approximation interval obtained at step S70. Here, intra-interval error value reaching the maximum value unit that the value is preferably reduced.

By identifying functional approximation interval having the intra-interval maximum error value, the functional approximation interval whose error value is most preferably reduced can be extracted.

Now, the above intra-interval error values correspond to approximation accuracy since they are parameterized errors of functional approximation intervals. Reducing the error values has the same meaning as improving the corresponding approximation accuracy. Therefore, by identifying the maximum error interval, i.e., the functional approximation interval having the intra-interval maximum error value, an image processing device of the embodiment can identify functional approximation intervals whose approximation accuracy should be improved.

Note that, if there exist multiple intervals having the maximum error value, the CPU 519 selects in search order the first interval among them as the maximum error interval. Then, the flow goes to step S110.

At step S110, the CPU 519 functions as a processing time measuring unit, accesses the timer circuit 8 to determine whether there still remains enough processing time. If so, the flow goes to step S120, otherwise to step S170.

Note that the timer circuit 8 may be configured by known counter circuit or clock etc. which can measure processing time, though the details will be omitted herein. For example, counter circuits may be used for this purpose which is initialized at the start of the processing sequence, starts decreasing by 1 with a clock counting a certain period (not shown) on set at initializing with a value corresponding to the pre-defined processing time (predetermined processing time), and stops the decreasing operation when the value equals to 0. In this configuration, at step S110 described above, the CPU 519 can determine whether the predetermined processing time (pre-defined processing time) is not exceeded at the moment by determining whether the counter of the timer circuit reaches 0. For example, assuming that the pre-defined processing time is 5 seconds and a subtracting clock of the counter enters the counter 12000 times per one second, the initial value for the counter needs to have a value of 60000 on the above initialization.

Note that the predetermined processing time (pre-defined processing time) may be user-defined as appropriate. In this case, the users can operate an input operation unit (not shown) to enter desirable time and the CPU 519 can receive the entered time and set the initial counter value according to the time.

In this way, the CPU 519 determines in the steps whether elapsed time (processing time) from the start of the processing exceeds the predetermined processing time based on the result of measuring elapsed time by the timer circuit 8. If so, a set of approximation accuracy improvement (step S140 to S160 described below) will not be performed and the set of vectorization will be terminated. Otherwise, the improvement will be performed. Therefore, if the processing time is within the predetermined processing time, then a set of approximation accuracy improvement can be performed for further improving accuracy, so the approximation accuracy can be improved within limitation which is considered to be practically valid in terms of processing time.

Next, at step S120, it is determined whether the intra-interval maximum error value obtained at step S100 exceeds the pre-defined threshold (e.g., 4). If so, the flow goes to step S130, otherwise to step S170. As described above, as a functional approximation interval corresponding to the intra-interval maximum error value is one whose approximation accuracy should be improved among multiple functional approximation intervals, the above pre-defined threshold can be used as an acceptable value for the predetermined approximation accuracy.

In this embodiment, since a set of approximation accuracy improvement are performed only if the intra-interval maximum error exceeds the pre-defined threshold (acceptable value of approximation accuracy), the further approximation accuracy improvement need not be performed if the maximum value is within the approximation accuracy acceptable for users. Therefore, output can be obtained within the practical range which is valid in terms of approximation accuracy. Additionally, processing time reduction can be facilitated while keeping the approximation accuracy acceptable for users since the process can be changed to the output process when approximation accuracy requested at the very least is achieved.

At step S130, the CPU 519 functions as a data amount determining unit, and determines whether data amount of error value information of generated rough profile with anchor points data or each functional approximation interval shown in FIG. 10 or FIG. 12 has already reached the pre-defined data amount. The pre-defined data amount is an acceptable value of 5 MB, for example. The CPU 519 goes to step S140 if the data amount has not reached the above acceptable value yet. Otherwise, i.e., if the data amount has already reached the pre-defined acceptance value (for example, 5 MB), the CPU 519 goes to step S170.

Here, the data amount (data capacity) of the rough profile with anchor points data $D_1$ illustrated in FIG. 10 can be calculated as follows. For convenience, all the elements in FIG. 10 have 4 byte length. Those elements include the total number of profile line loops in the image, the total number of intervals in each profile loop, each point's coordinate value (a combination of x coordinate and y coordinate) in each interval, and the point number of pf. Also, the elements have coordinate values (a combination of x coordinate and y coordinate) of control points and pointers (address information) to the area for next interval, etc. Therefore, the data amount $D_1$ can be represented as:

$$D_1 = 4 \times (\text{SUM}(\beta_{11}, \beta_{12}, \cdots, \beta_{1\alpha_1}) + \text{SUM}(\beta_{21}, \beta_{22}, \cdots, \beta_{2\alpha_2}) + \cdots \text{SUM}(\beta_{a1}, \beta_{a2}, \cdots, \beta_{a\alpha_a}) + 4 \times \text{SUM}(\alpha_1, \alpha_2, \cdots, \alpha_a) + a + 1)$$

Additionally, the data amount $D_2$ of the information of the error values in each functional approximation interval illustrated in FIG. 12 can be calculated as follows. Here, as in the case of $D_1$, for convenience, all the elements in FIG. 12 have 4 byte length. Those elements include the total number of profile line loops in the image, the total number of intervals in each profile loop, intra-interval error values of each interval, and pointers (address information) to the data area for next interval, etc. Therefore, the data amount $D_2$ can be represented as:

$$D_2 = 4 \times (2 \times \text{SUM}(\alpha_1, \alpha_2, \cdots, \alpha_a) + a + 1)$$

where the SUM( ) means a summing function for all the elements.

Specifically, at step S130, the CPU 519 determines whether $$D_1 = D_1 + D_2$$
$$= 4 \times (\text{SUM}(\beta_{11}, \beta_{12}, \cdots, \beta_{1\alpha_1}) + $$
$$\text{SUM}(\beta_{21}, \beta_{22}, \cdots, \beta_{2\alpha_2}) + \cdot \text{SUM}(\beta_{a1}, \beta_{a2}, \cdots, \beta_{a\alpha_a}) + $$
$$6 \times \text{SUM}(\alpha_1, \alpha_2, \cdots, \alpha_a) + 2 \times a + 2)$$

is less than 5M, $5 \times 2^{2C} = 5242880$. If the generated data amount D is less than the predetermined data amount (e.g., 5 MB), the CPU 519 goes to step S140. Otherwise, that is, if D has already reached the predetermined data amount, the CPU 519 goes to S170.

In this way, the CPU 519 determines at those steps whether the amount of data (the generated data amount D) containing at least the rough profile with anchor points data or the information of the error values of each functional approximation interval reaches the predetermined data amount. Then, if the generated data amount D exceeds the predetermined data amount, a set of approximation accuracy improvement (step S140 to S160 described below) will not be performed, and the vectorization sequence will be terminated. Otherwise, the set of accuracy improvement will be performed. Therefore, if the data amount D generated by the process is within an acceptable range, the further processes can be performed for further improving the approximation accuracy. Consequently, the approximation accuracy can be maximized within the acceptable data amount.

Next, at step S140, the CPU 519 functions as an interval dividing unit and divides the maximum error interval obtained at step S100 to create even more multiple functional approximation interval in the maximum error interval. That is, the CPU 519 dually divides the maximum error interval obtained above with the point pf on the curve which is farthest distant from the line segment p1pN connecting the anchor points p1 and pN of the interval obtained at step S60, which generates a first interval having the point p1 and pf as its anchor points and a second interval having the point pf and pN as its anchor points. Then, the CPU 519 functions as a second functional approximation unit and performs the same process as at step S60 for each of the first and second interval. That is, for each divided interval, a point on the curve (referred to as "farthest point" hereinafter) which is farthest distant from a line segment connecting two anchor points in the interval and two control points are determined.

Figure 11A:
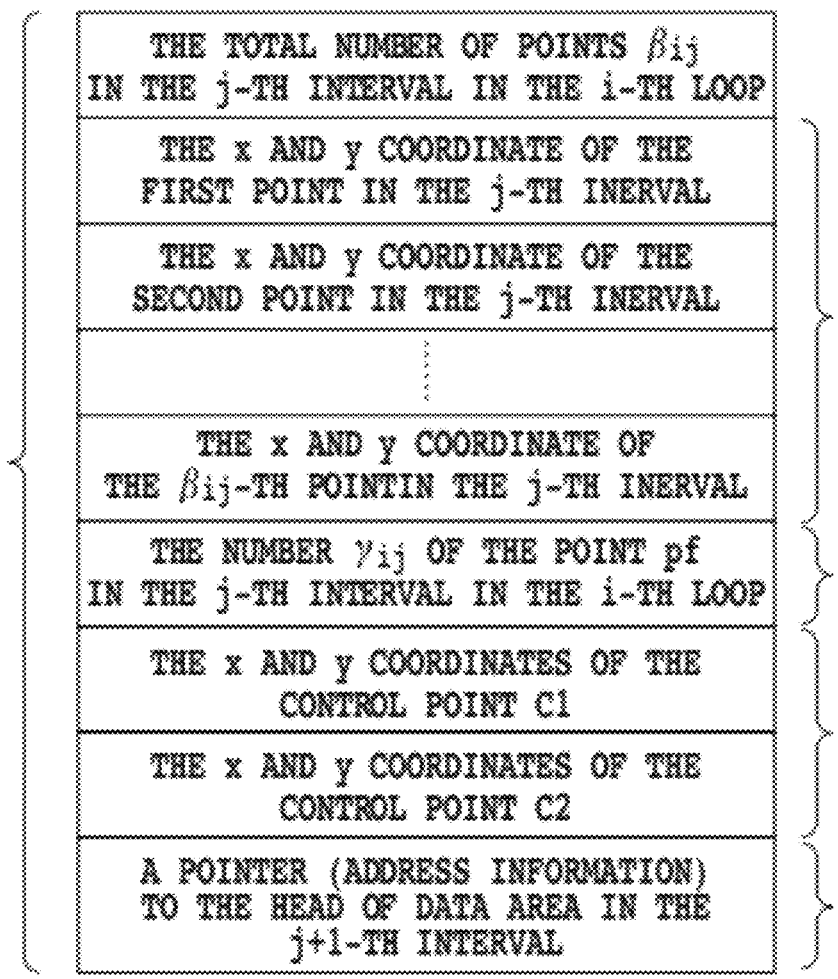
FIG. 11A to 11C illustrate an exemplary updating process for rough profile data with anchor points after dividing the maximum error interval in accordance with an embodiment of the invention.
Figure 11B:
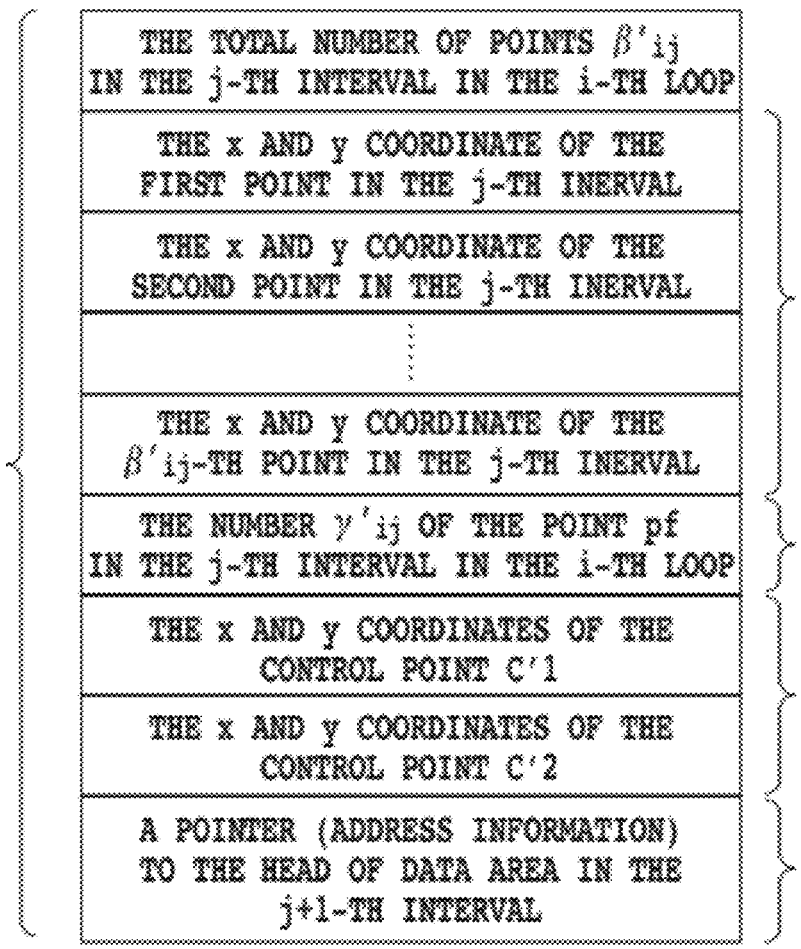
Figure 11C:
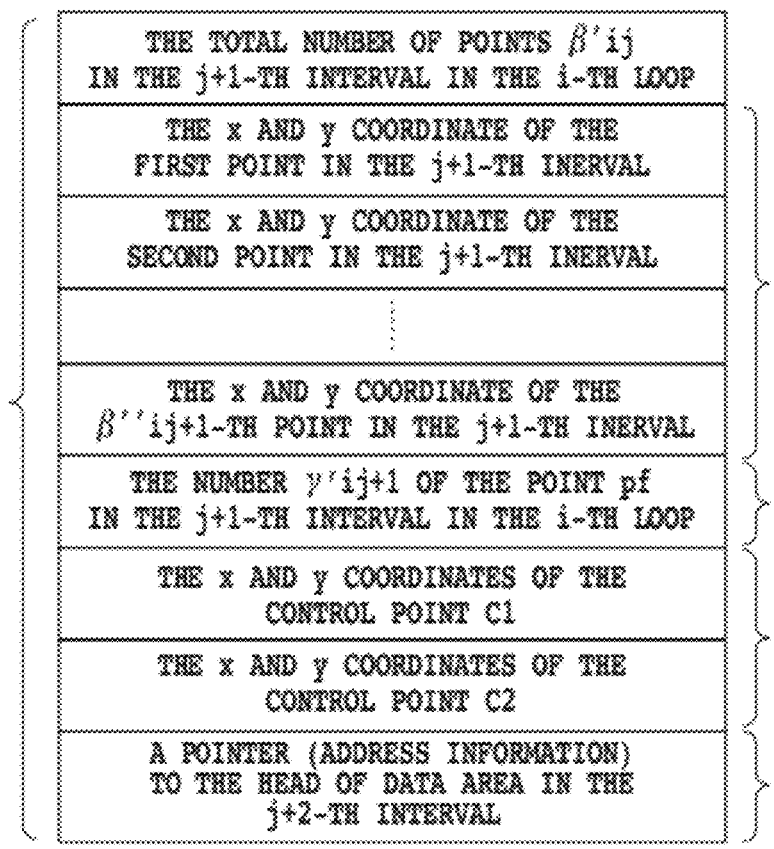

At this point, the rough profile with anchor points data illustrated in FIG. 10 is changed in a way illustrated in FIG. 11A to 11C. That is, in the figures, assuming that an interval to be divided is the j-th functional approximation interval in the i-th loop, the data of the interval not divided is illustrated in FIG. 11A. The data of the first interval after dividing is illustrated in FIG. 11B, and data of the second interval is illustrated in FIG. 11C.

FIG. 11B includes the coordinates of points aligning between p1 and the preceding point of pf, the farthest point newly obtained, the two control points, and an area for a pointer to the initial address of the data area storing data of the second interval, which is newly stored in the RAM 520 at this step. Those data can be generated by replacing the data illustrated in FIG. 11A.

FIG. 11C includes each coordinate of points aligning between p1 and the preceding point of pN of an interval whose anchor points are p1 and pN, the farthest point newly obtained, and the two control points. Furthermore, it also includes a pointer area which contains a pointer (address information) value for the head of the j+1th interval's data area before dividing, which is originally on the last of the data illustrated in FIG. 11A, as those for the head of the j+2 intervals after dividing. Note that the j+1th interval becomes the j+2th interval after the step.

At this time, data amount $\Delta D_1$ in byte of the data area storing the second interval's data newly stored in the RAM 520 at this step is represented as:

$$\Delta D_1 = 4 \times (\epsilon + 5),$$

where ϵ means the number of points between the farthest point (pf) and pN of the original interval.

After the completion of step S140, the flow goes to step S150. At step S150, the CPU 519 functions as a second intra-interval approximation accuracy calculation unit, and calculates each intra-interval error value for the two functional approximation intervals (the first and second interval) generated at step S140 in the same way at step S70. The CPU 519 stores the intra-interval error of the first interval of each of the calculated intra-interval error in a storage area of intra-interval error for the k-th functional approximation interval of the original i-th loop. Then, a storage area of intra-interval error for the second functional approximation interval is newly created in the RAM 520 at this step.

In this case, a pointer (address information) value for the intra-interval error for the second functional approximation interval is stored in a pointer (address information) area for the intra-interval error value area of the next (i.e., k+1-th) functional approximation interval for the k-th functional approximation interval of the original i-th loop. The pointer (address information) value is newly created in the RAM 520 at this step. On the other hand, the pointer area newly created in the RAM 520 stores the following value. That is, the pointer area stores a pointer (address information) value for the intra-interval error value areas originally placed at the k+1-th position (which will be the k+2 one) in FIG. 13A.

Figures 13A, 13B:
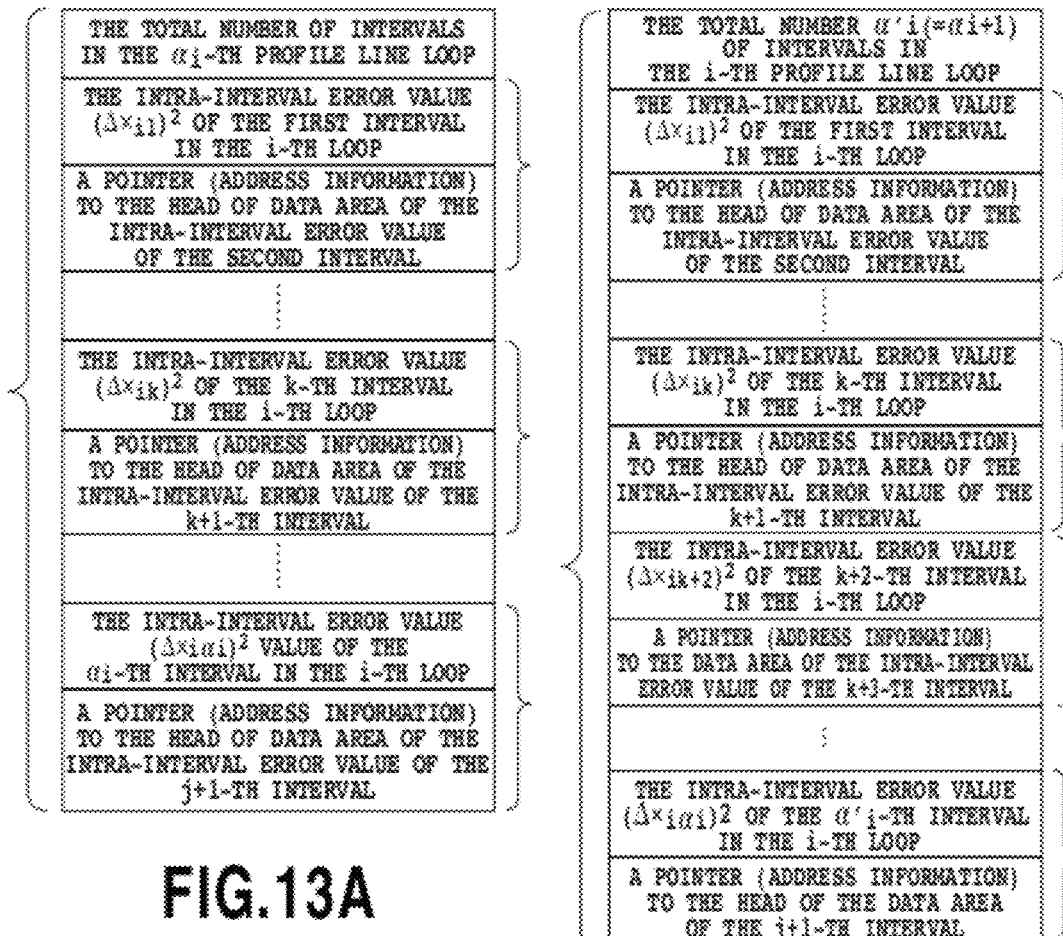
FIGS. 13A and 13B illustrate an exemplary updating process for error values of functional approximation intervals obtained by dividing the maximum error interval in accordance with an embodiment of the invention.

FIGS. 13A and 13B shows the example. In the figures, assuming that the j-th functional approximation interval of the i-th loop is divided, the intra-interval error values of the interval before dividing are represented in FIG. 13A. FIG. 13B illustrates the data of the intra-interval error values after dividing. Data amount $\Delta D_2$ in byte of data area newly created in the RAM 520 at this step will be:

$$\Delta D_2 = 4 \times 2 = 8$$

After the completion of step S150, the flow goes to step S160. At step S160, as in the same way at step S100, the CPU 519 functions as a second candidate interval-to-be-divided identification unit, and identifies a functional approximation interval having the maximum intra-interval error value from the intra-interval error values updated at step S150. That is, the identifies the maximum intra-interval error by obtaining the maximum values among intra-interval errors obtained at step S150 using the pointer information for data for each interval. If there are multiple intervals having the maximum error value, the first interval in terms of the search order will be selected as the maximum error interval. Then the flow goes back to the step S110.

Hereinafter, the processes from step S110 to S160 will be repeated until the flow branches to step S170 at either of step S110, S120, and S130. However, data amount to be checked at step S130 is determined using data amount D. D is generated by adding $\Delta D$ on repeating each process at step S110 to S160 ($\Delta D \leftarrow D + \Delta D$). $\Delta D$ is calculated by adding the above $\Delta D_1$ and $\Delta D_2$:

$$\Delta D = \Delta D_1 + \Delta D_2$$
$$= 4 \times (\varepsilon + 5) + 8$$
$$= 4 \times \varepsilon + 28$$

Now, at step S170, the CPU 519 outputs each data of the anchor points and control points in each functional approximation interval obtained by then into a predefined device or outside the device. That is, the data is output to the hard disk 522 via the I/O 521 in the desirable known data format while searching in order within the rough profile with anchor points maintained in the format illustrated in FIGS. 10 and 12 using the pointer information. Alternatively, the data is output to the outside of the device via the communication interface 4. Note that as the desirable known data format, the Scalable Vector Graphics (SVG) etc. can be used for example.

In this way, the data amount determining process such as step S110 and the processing time measuring process such as step S130 are performed in the embodiment.

In the data amount determining process, a set of approximation accuracy improvement (step S140 to S160 described below) are determined to be performed until it is determined that the generated data amount D has reached the predetermined data amount of acceptance value. Based on the determination, the maximum intra-interval error value (functional approximation intervals in which approximation accuracy should be improved) identified at step S100 or S150 may be divided by the approximation accuracy improvement described above and functional approximation for each intervals generated by with the division and calculate approximation accuracy may be performed.

Similarly, when the processing time measuring process is performed, the set of approximation accuracy improvement is determined to be performed until it is determined that the processing time has exceeded the predetermined processing time of acceptance value.

Therefore, the approximation accuracy can be maximized as far as the data amount is within the acceptable data amount and the processing time is acceptable.

The Second Embodiment

Figure 14B:
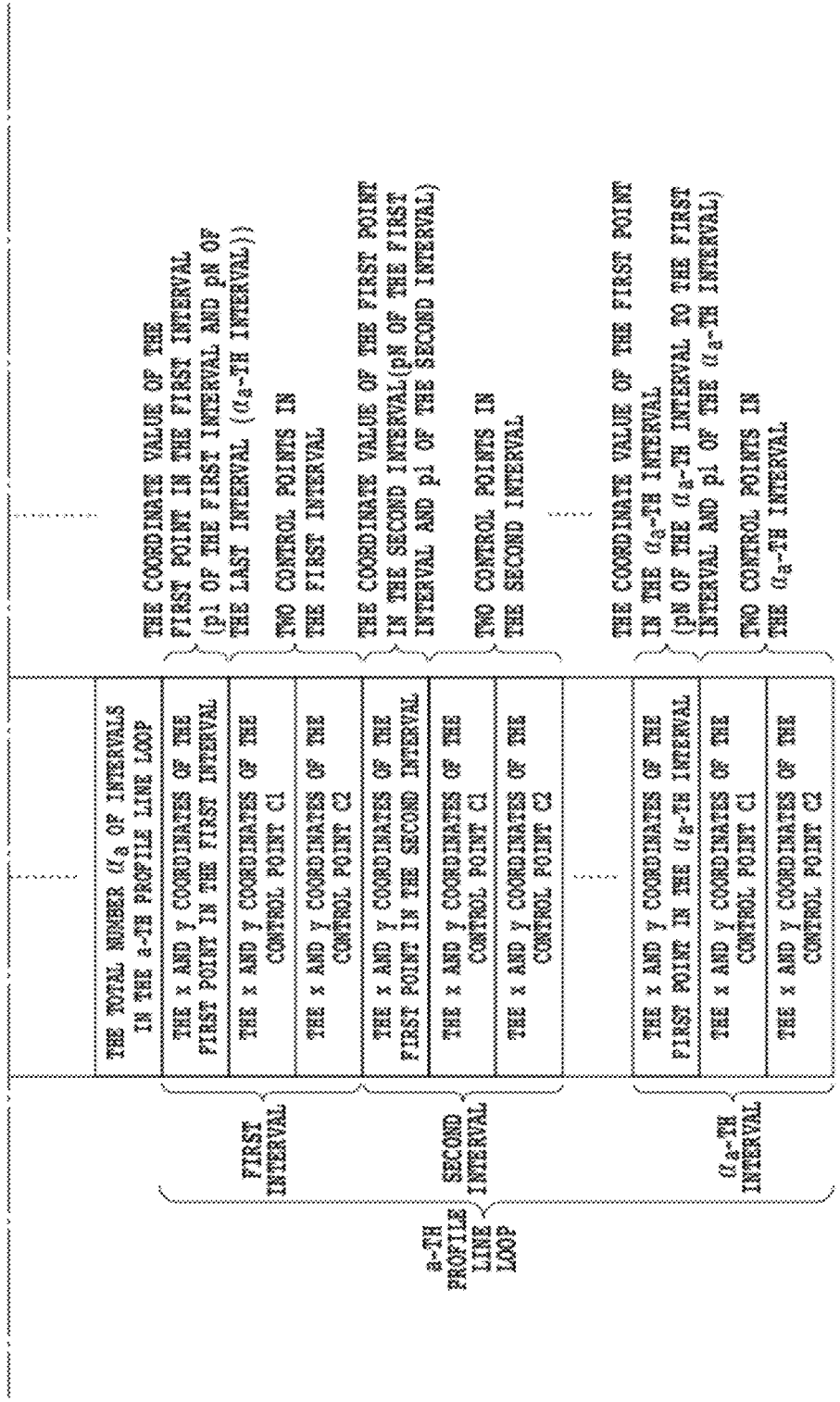
FIG. 14B is a block diagram showing an exemplary vector data form output at step S170 in accordance with an embodiment of the invention.

The above data formats illustrated in FIG. 10, FIG. 11, FIG. 12, and FIG. 13 are only exemplary and are not any limitation. Additionally, vector formats are also not limited to the vector data format output at step S170 of FIG. 3 described in the first embodiment. That is, for data of each profile line loop following the total number of profile line loops (a) in FIG. 10, data of each functional approximation interval following the number of intervals in the profile line ($\alpha_r$) are configured only with the anchor point p1 and two control points C1 and C2. Of course, each data may be gathered and packed in the sorting order of functional approximation interval (i.e., of $\alpha_r$ intervals). The vector data format of this case is illustrated in FIG. 14.

The Third Embodiment

Although the above embodiments describe that a binary image can be obtained by binarizing images read by the scanner 1, they are not any limitation. For instance, of course, the image may be input from outside the system (such as scanners or PCs connected to network) through network via the communication interface 4.

Also, in the above embodiments, the above image processing device can be implemented with digital copy machine, printer connected to network, or PC, etc.

The Fourth Embodiment

At step S140, it is described that data of functional approximation intervals before dividing illustrated in FIG. 11A are divided into the first part of the data after dividing illustrated in FIG. 11B and the second part illustrated in FIG. 11C. In this case, FIG. 11B includes the coordinates of points between p1 to the preceding point of pf and the farthest point newly obtained and two control points. Furthermore, FIG. 11B also includes a pointer area for the initial address of the data area storing data of the second interval newly created in the RAM 520 at this step. Therefore, if the data area illustrated in FIG. 11B is generated by rewriting the data area illustrated in FIG.

11A, the data area storing each coordinate of the points between pf and pN will be unnecessary.

Thus, at step S140, data may be configured such that the unnecessary area can be packed to avoid scattered unnecessary areas. That is, after data illustrated in FIG. 11C are generated in such a way as the operation at the above step S114, there exist data areas for $\epsilon$ points in the second part of the original data area illustrated in FIG. 11A which has become unnecessary after generating the data illustrated in FIG. 11B. Therefore, the data area following the original data area illustrated in FIG. 11A may be rearranged in the RAM 520 by sequentially packing them for data area for the $\epsilon$ points. This requires data migration and rewriting all of the values in the storage area for pointers (address information) needed for the moved data area, therefore processing time slows down at that rate. However, as the data area uselessly scattering in the RAM 520 will be unnecessary, there will be certain benefit that the memory area can be used efficiently during the process.

Additionally, in this case, the data amount $\Delta D_1$ in byte of the data area newly allocated in the RAM 520 at steps will be:

$$\Delta D_1 = 4 \times (\varepsilon + 5 - \varepsilon)$$
$$= 20$$

The Fifth Embodiment

So far, the embodiments of the invention have been described with checking both processing time and data amount, the embodiments are not limited to such description and only one of the checking may be used. That is, although it is determined at step S110 whether there remains still enough processing time, at step S130 whether the generated data amount is acceptable in the description above, only one of step S110 and S130 may be performed.

That is, when only processing time is checked and data amount is not checked, step S130 in the flowchart of FIG. 3 need not be performed, the flow only needs to go to step S140 rather than step S130 after the above step S120. In this case, when the processing time is not limited and the memory capacity available for the data area generated during a process is limited, functional approximation can be achieved whose approximation accuracy is improved compared to the prior art. Also, when the processing time is not checked and only data amount is checked, it is only necessary to do the followings. That is, step S110 in the flowchart of FIG. 3 is not performed, the flow only needs to go to step S120 rather than step S130 after the above step S100 or S160. In this case, the memory available for the data area generated during a process is sufficiently allocated, and when the processing time is limited, functional approximation can be achieved whose approximation accuracy is improved compared to the prior art.

The Sixth Embodiment

In the description of the above embodiment, $(\Delta x)^2$ is used for the intra-interval error value obtained at step S70, this is not any limitation. Other than that, for instance, $\Delta x$ obtained by the above equation (4) may be used for the intra-interval error value. Additionally, though not being optimal in terms of accuracy $|Pdx-pfx|+|Pdy-pfy|$ may be used for the intra-interval error value, and in this case, improvement in calculation rate of the error values can be expected.

Other Embodiments

The invention can be applied to both a system composed of multiple apparatuses (e.g., computers, interface devices, readers, printers, etc.) and a device composed of one apparatus (e.g., multi function peripheral equipments, printers, facsimile devices, etc.).

A processing method in which programs that executes the configurations of the above embodiments for achieving the functions of the above embodiments are stored in a storage medium, and the programs are read as codes and executed in a computer is also within the scope of the above embodiments. That is, the computer readable storage medium is also within the scope of the embodiments. Also, as well as storage media storing computer programs which the computer can execute, the computer programs themselves are also included within the scope of the above embodiments.

As for the storage media, for example, floppy (trade mark) disk, hard disk, optical disk, optical magnetic disk, CD-ROM, magnetic tape, volatile memory card, and ROM can be used.

Also, as well as systems which performs processes as a single program stored in the storage medium, systems which operates on an OS in connection with functions of an extension board to execute the above operations of the embodiments are also included within the scope of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-121158, filed May 7, 2008, which is hereby incorporated by reference herein in its entirety.

What is claimed is:

1. An image processing device comprising:
   an obtaining unit for obtaining rough profile vector data composed of a point sequence representing a figure as a sequence of straight lines;
   a functional approximation interval configuring unit for configuring multiple functional approximation intervals for the obtained rough profile vector data by setting dividing points for dividing the point sequence of the obtained rough profile vector data;
   a functional approximation unit for functionally approximating each of the configured multiple functional approximation intervals;
   a calculation unit for calculating an approximation error value for each of the multiple functional approximation intervals;
   an identification unit for identifying a functional approximation interval having a maximum approximation error value from among the multiple functional approximation intervals based on the calculated approximation error values;
   an interval dividing unit for setting further multiple functional approximation intervals in the functional approximation interval having the maximum approximation error value identified by said identifying unit; and
   a determining unit for performing at least one of:
   determining whether a current amount of data, which includes at least the rough profile vector data with the dividing points and data of the approximation error value calculated for each of the multiple functional approximation intervals, reaches a pre-defined data amount, and
   determining whether elapsed time since a process started exceeds a pre-defined time,
   wherein the image-processing device repeats the following processes until it is determined by said determining unit that the current amount reaches the pre-defined data amount or the elapsed time exceeds the pre-defined time:
- a process by said functional approximation unit for functionally approximating each of the multiple function approximation intervals set by said interval dividing unit,
- a process for calculating an approximation error value by said calculation unit,
- a process for identifying a functional approximation interval having a maximum approximation error value by said identification unit, and
- a process for setting further functional approximation intervals by said interval dividing unit.

2. The image processing device of claim 1, wherein said interval dividing unit sets the further multiple functional approximation intervals in the functional approximation interval having the maximum approximation error value, only if the maximum approximation error value exceeds a pre-defined threshold.

3. The image processing device of claim 1, wherein said obtaining unit comprises:
- a unit for obtaining a binary image targeted for vectorization; and
- a unit for extracting the rough profile vector data based on figure boundaries included in the binary image.

4. The device of claim 1, wherein the functional approximation is that with a third-order Bezier curve.

5. An image processing method comprising:
- an obtaining process for obtaining rough profile vector data composed of a point sequence representing a figure as a sequence of straight lines;
- a functional approximation interval configuring process for configuring multiple functional approximation intervals for the obtained rough profile vector data by setting dividing points for dividing the point sequence of the obtained rough profile vector data;
- a functional approximation process for functionally approximating each of the configured multiple functional approximation intervals;
- a calculation process for calculating an approximation error value for each of the multiple functional approximation intervals;
- an identification process for identifying a functional approximation interval having a maximum approximation error value from among the multiple functional approximation intervals based on the calculated approximation error values;
- a determining process for performing at least one of:
  - determining whether a current amount of data, which includes at least the rough profile vector data with the dividing points and data of the approximation error value calculated for each of the multiple functional approximation intervals, reaches a pre-defined data amount, or
  - determining whether elapsed time since a process started exceeds a pre-defined time;
- an interval dividing process for setting further multiple functional approximation intervals in the functional approximation interval having the maximum approximation error value by setting new dividing points in the functional approximation interval having the maximum approximation error value; and
- a controlling process for controlling to repeat said functional approximation process for the further multiple functional approximation intervals, said calculation process, said identification process and said interval dividing process, until it is determined in said determining process that the current amount reaches the pre-defined data amount or the elapsed time exceeds the pre-defined time.

6. The method of claim 5, wherein said interval dividing process sets the further multiple functional approximation intervals in the functional approximation interval having the maximum approximation error value, only if the maximum approximation error value exceeds a pre-defined threshold.

7. The method of claim 5, wherein said obtaining process comprises:
- a process for obtaining a binary image targeted for vectorization; and
- a process for extracting the rough profile vector data based on figure boundaries included in the binary image.

8. The method of claim 5, wherein the functional approximation is done with a third-order Bezier curve.

9. A non-transitory computer-readable storage medium storing a program readable by a computer, which by executing the program functions as an image processing device comprising:
- an obtaining unit for obtaining rough profile vector data composed of a point sequence representing a figure as a sequence of straight lines;
- a functional approximation interval configuring unit for configuring multiple functional approximation intervals for the obtained rough profile vector data by setting dividing points for dividing the point sequence of the obtained rough profile vector data;
- a functional approximation unit for functionally approximating each of the configured multiple functional approximation intervals;
- a calculation unit for calculating an approximation error value for each of the multiple functional approximation intervals;
- an identification unit for identifying a functional approximation interval having a maximum approximation error value from among the multiple functional approximation intervals based on the calculated approximation error values;
- an interval dividing unit for setting further multiple functional approximation intervals in the functional approximation interval having the maximum approximation error value identified by said identifying unit; and
- a determining unit for performing at least one of:
  - determining whether a current amount of data, which includes at least the rough profile vector data with the dividing points and data of the approximation error value calculated for each of the multiple functional approximation intervals, reaches a pre-defined data amount, and
  - determining whether elapsed time since a process started exceeds a pre-defined time,
- wherein the image processing device repeats the following processes until it is determined by said determining unit that the current amount reaches the pre-defined data amount or the elapsed time exceeds the pre-defined time:
  - a process by said functional approximation unit for functionally approximating each of the multiple function approximation intervals set by said interval dividing unit,
  - a process for calculating an approximation error value by said calculation unit,
  - a process for identifying a functional approximation interval having a maximum approximation error value by said identification unit, and
  - a process for setting further functional approximation intervals by said interval dividing unit.

* * * * *